United States Patent [19]

Leszczynski

[11] Patent Number: 5,157,639
[45] Date of Patent: Oct. 20, 1992

[54] ULTRASONIC DETECTOR

[75] Inventor: Nicholas Leszczynski, Amherst, N.Y.

[73] Assignee: Magnetrol International, Downers Grove, Ill.

[21] Appl. No.: 578,557

[22] Filed: Sep. 4, 1990

[51] Int. Cl.$^5$ .............................................. G01S 15/00
[52] U.S. Cl. .................................... 367/99; 367/908
[58] Field of Search ................ 367/105, 98, 99, 124, 367/901, 908; 73/290 V; 340/621

[56] References Cited

U.S. PATENT DOCUMENTS 4,984,449  1/1991  Caldwell et al. ................. 73/290 V Primary Examiner—Daniel T. Pihulic
Attorney, Agent, or Firm—Marshall, O'Toole, Gerstein, Murray & Bicknell

[57] ABSTRACT

An ultrasonic detector of the type used to detect the level of a liquid or the magnitude of liquid flow within a conduit by periodically transmitting ultrasonic energy bursts and receiving echoes therefrom is controlled by a controller with a computer program having a number of routines. The routines include a range search routine that searches a defined range of the detector to locate the targets within the range. The range is searched by repeatedly transmitting energy bursts and gradually decreasing the gain of the detector after the transmission of each burst. All targets identified during the range search are then classified as being either bogus targets or the true target. This classification is made with the use of a bogus buffer in which bogus target data is stored. The detector has a first mode of operation in which the first echo received after the transmission of an energy burst is considered to be the true target and a second mode of operation in which the echo having the largest magnitude is considered to be the true target. The detector identifies the precise time of arrival of an echo by detecting the peak of the echo, which is accomplished by sampling the echo signal at a very high rate and generating digital samples therefrom. The largest digital sample is then identified as corresponding to the echo peak. The detector also includes a gain adjustment routine that allows authorized personnel to adjust the gain of the detector.

69 Claims, 23 Drawing Sheets

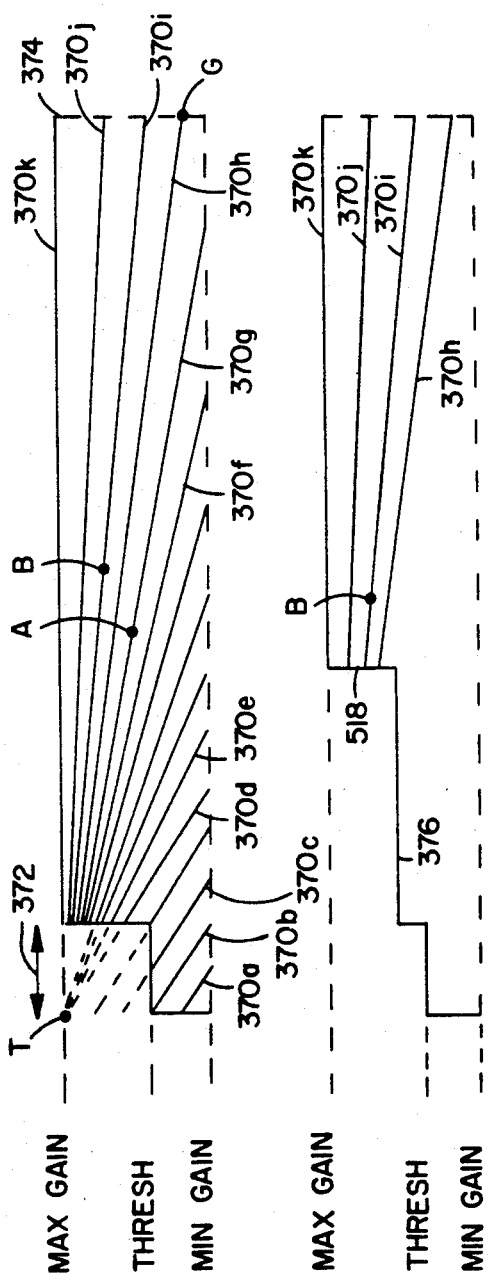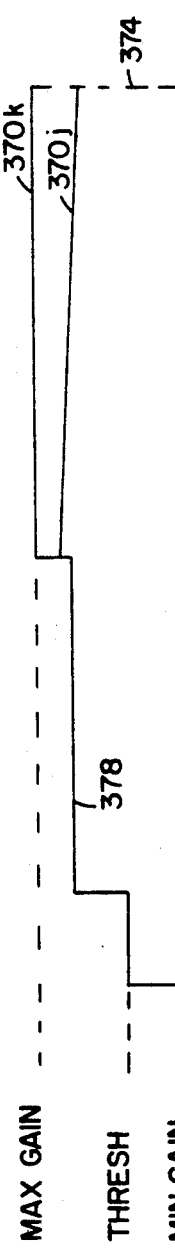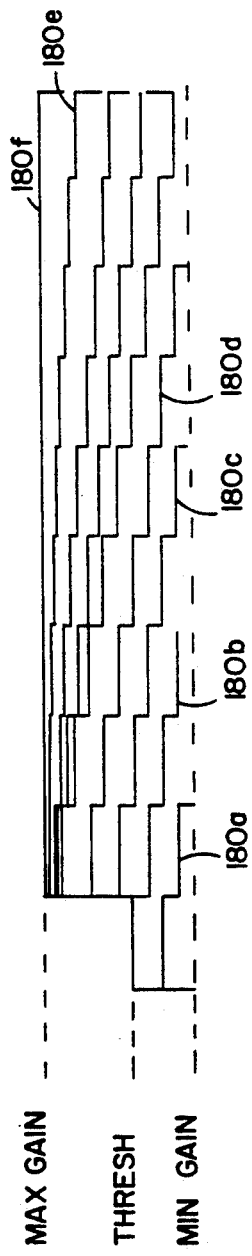
FIG. 7a
FIG. 7b
FIG. 7c
FIG. 7d

SEARCH BUFFER

| TARGET # | TRAVEL TIME |
|---|---|
| 1 | $T_1$ |
| 2 | $T_2$ |
| 3 | $T_3$ |
| 4 | $T_4$ |
| 5 | $T_5$ |

| TARGET # | AVERAGING INDEX | TOTAL TRAVEL TIME | TOTAL ECHO MAGNITUDE | TOTAL GAIN |
|---|---|---|---|---|
|  |  | ACC | ACC | ACC |
|  |  | 407 | 409 | 411 |

FIG. 9b

CLASSIFICATION BUFFER — 415

| TARGET # | AVE. DIST. | AVE. MAG. | AVE GAIN | BOGUS |
|---|---|---|---|---|
| 1 | 20 FT | 2.0 V | 2 | 1 |
| 2 | 25 FT | 1.8 V | 3 | 1 |
| 3 | 35 FT | 1.0 V | 5 | 0 |
| 4 | 38 FT | 1.5 V | 6 | 0 |

FIG. 9c

BOGUS BUFFER — 425

| TARGET # | DISTANCE |
|---|---|
| 1 | 20 FT |
| 2 | 25 FT |

FIG. 9d

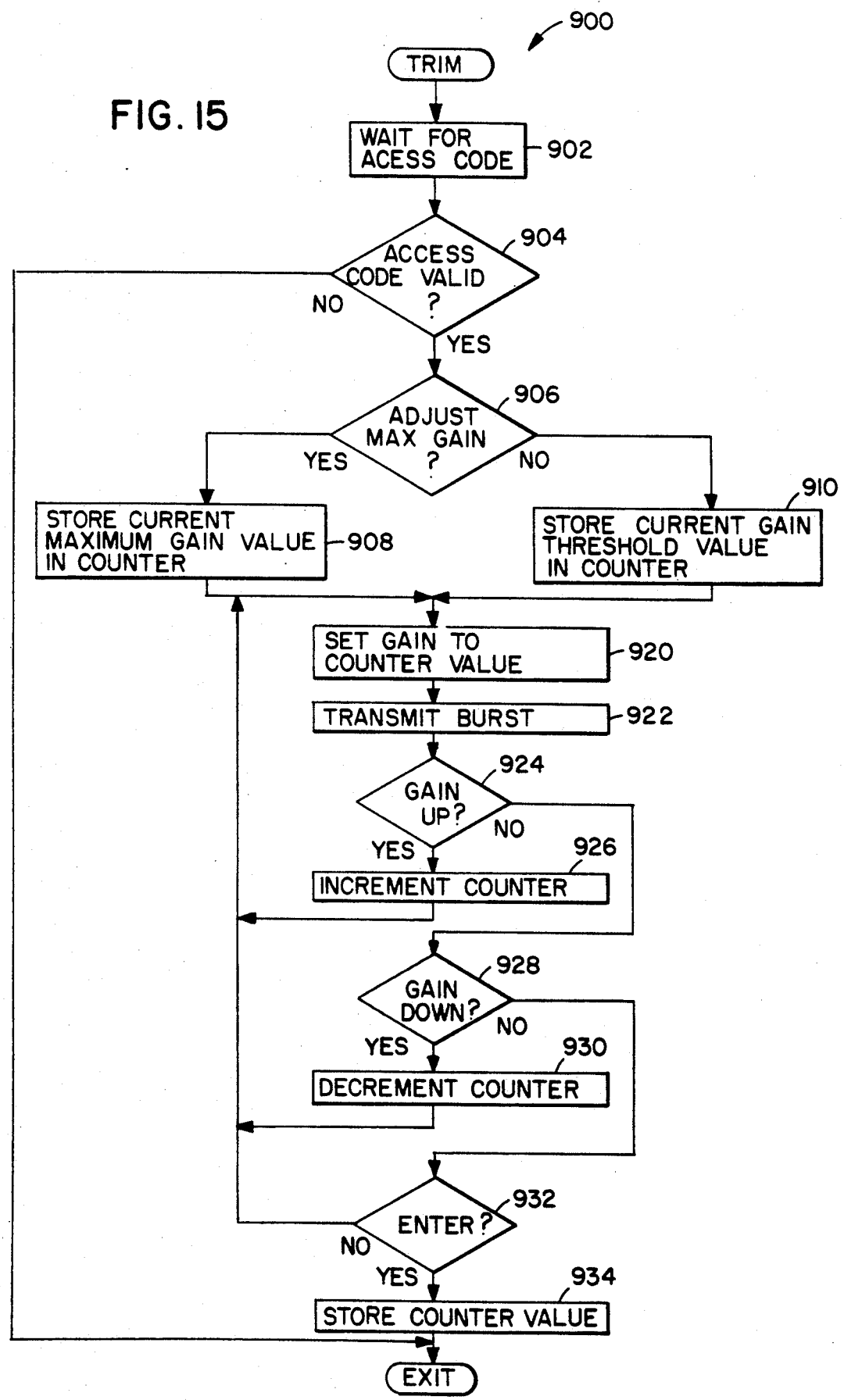

ULTRASONIC DETECTOR

BACKGROUND OF THE INVENTION

The present invention relates to various aspects of ultrasonic detectors of the type that are used to determine the location of a level within a tank or the magnitude of flow within a conduit.

Ultrasonic detectors may be used to determine the level of the liquid in a tank or the magnitude of the flow of liquid within a conduit. Such detectors have transducers that emit bursts of ultrasonic energy and respond to echoes of the bursts that are reflected by various surfaces. For example, a detector that determines the level of a liquid in a tank transmits energy bursts towards the liquid surface and detects when echoes of the energy bursts are received. The detector then determines the liquid level based upon the time difference between the transmission of an energy burst and the receipt of the corresponding echo. This travel time of an energy burst is directly related to the distance from the transducer to the liquid surface.

The manner in which echoes are detected by ultrasonic detectors varies. In some detectors, the time at which an echo is received is determined by comparing the magnitude of an electrical signal generated from the echo by the transducer to a predetermined value. This comparison may be accomplished by a comparator having a predetermined voltage threshold. When the magnitude of the echo signal surpasses the comparator threshold, the comparator generates an echo-received signal that signifies receipt of the echo and is used to determine the liquid level or flow. Although this manner of detecting when echoes are received is generally satisfactory, it is incapable of precisely determining the exact time of receipt of an echo.

Another method of detecting the receipt of echoes is to use an A/D converter to periodically sample the echo signal. One example of this method is described in U.S. Pat. No. 4,000,650 to Snyder. A significant disadvantage of the Snyder method of detecting the echo signal is that the rate at which the echo signal is sampled by the A/D converter is relatively low. The Snyder detector does not sample in order to detect the peak of the echo signal, it samples in order to locate the echo. For example, in one mode, the Snyder detector is responsive to echoes within a range between 14 to 158 feet, for which the maximum round-trip travel time of an energy burst is stated to be 288 milliseconds. During this time, the Snyder detector samples the electrical signal generated by the transducer only 288 times, or once each millisecond. This rate of sampling, while it may detect the general position of the echo, is simply not sufficient to generate a precise determination of the peak of the echo signal, and thus the precise time at which the echo arrived at the transducer.

Conventional ultrasonic detectors of the type that detect liquid level or flow are generally not capable of locating the presence of multiple targets at various unknown points within a defined range. Such targets might include a single "true" target such as the surface of a liquid within a tank the position of which is being measured and a number of "bogus" targets such as targets corresponding to internal tank structure the position of which is not of interest. Determining the presence of multiple targets within a defined range would be useful for a number of purposes, for example, to aid in distinguishing the true target of interest from bogus targets.

Conventional detectors are also deficient in the manner in which true targets are distinguished from bogus targets. Such detectors generally require the manual measurement of bogus targets and the manual entry of bogus target information. The manual measurement of the distances from the detector at which bogus targets are located may result in errors due to the inaccuracy or limited accuracy of the measurement. The manual entry of bogus target information by an operator may be subject to error. These errors might cause the detector to mistake the true target as a bogus target, or to consider the bogus target to be the true target. In either case, the operation of the detector would be adversely affected.

Conventional detectors are also deficient in that they are incapable of distinguishing between a true echo and a spurious echo associated with the true echo. In certain tanks and/or under certain conditions, such as whether or not the detector is mounted close to a wall of the tank, the true echo generated by the perpendicular path to the liquid surface may be followed relatively quickly by a spurious echo generated by the intersection of the liquid surface and the wall of the tank. This spurious echo may have a larger magnitude since the intersection of the liquid and the wall may be a better reflector of ultrasonic energy. Conventional detectors may not be capable of distinguishing between these two echoes, and may falsely interpret the larger-magnitude spurious echo as the true echo. As a result, the location of the liquid surface as determined by the detector will not correspond to the actual location of the liquid surface. The magnitude of the error will depend on such factors as the tank geometry and the location of the detector within the tank.

Another disadvantage of conventional detectors is that they often use potentiometers to adjust various electrical parameters, such as the gain at which echoes are received. The use of such potentiometers increases the cost of a detector. Another disadvantage is that the position of such a potentiometer may be adjusted by unauthorized personnel, either out of curiosity or in an attempt to adjust or calibrate the detector. Such unauthorized adjustment of the potentiometer is likely to be done incorrectly and adversely affect the operation of the detector, especially in view of the increased complexity of many ultrasonic detectors.

SUMMARY OF THE INVENTION

The present invention relates to various aspects of ultrasonic detectors of the type that are used to determine the location of the liquid level within a tank or the magnitude of liquid flow within a conduit.

In one aspect, the invention is directed to an ultrasonic detector that determines the precise time of arrival of echoes. The precise time of arrival of an echo is considered to be the time of arrival of the peak of the echo, which is that portion having the largest magnitude. Determining the precise time of arrival of an echo allows a more precise determination of the travel time of an echo, and thus the precise position of the surface from which the echo was reflected.

The precise arrival time is determined with the use of a method having two basic steps. The first step is to determine the period of time during which an echo is expected. The period of time may be determined by transmitting a burst of energy and determining when the corresponding echo is received by comparing the magnitude of the echo signal with a predetermined threshold.

The second step of determining the precise arrival time of an echo is to generate an electrical signal, or "conversion gate," that controls an A/D converter that is used to sample the echo signal. The duration of the conversion gate is made relatively small, and the conversion gate is "positioned" so that the echo will be received within the gate. The duration of the conversion gate is made relatively small, such as between about two and six times the duration of the echo signal. When the conversion gate is open, the A/D converter samples the electrical signal generated by the transducer at a relatively high rate. After the samples are taken, they are stored in a memory. The stored samples are then inspected to determine which of the samples has the largest magnitude. The sample having the largest magnitude is considered to correspond to the precise time of receipt of the echo, and the subsequent determination of the liquid level or flow is made based upon that precise time of receipt.

The use of a relatively small conversion gate and an A/D converter that samples at a relatively high rate is advantageous in that the peak of the echo signal can be determined with good precision without requiring a very large number of samples from the A/D converter to be stored in memory. As a result, the size of the memory required is relatively small.

In a second aspect, the invention is directed to a detector having the capability to determine the location of a number of targets within a given range of the detector. The detector accomplishes this determination by repeatedly transmitting energy bursts, and altering the gain at which echoes are received after the transmission of each burst. The gain after the transmission of each echo is altered in a unique manner.

For example, the gain after the transmission of each energy burst may be gradually reduced in accordance with a "gain line" having an initial gain value and a defined gain slope. By changing the initial gain value and/or gain slope, the gain after the transmission of each burst is changed in a unique manner. As a result, targets at different positions within the defined range of the detector will be detected at different times.

The effect of providing a unique gain line or characteristic following the transmission of each energy burst is to cause the detector to search a different portion of the defined range of the detector with each energy burst. Thus, if a relatively large number of unique gain lines or characteristics were used, the position of substantially all targets within the defined range of the detector could be detected.

In a third aspect, the invention is directed to an ultrasonic detector having the capability of distinguishing between a true target and one or more bogus targets. The detector in accordance with this aspect of the invention distinguishes bogus targets from a true target by comparing echo data relating to an echo with bogus target data stored in memory. If the echo data corresponds to the bogus target data, the echo is considered to be a bogus echo.

The manner in which the detector generates the bogus target data is particularly advantageous. The bogus target data may be generated automatically by the detector in accordance with the second aspect of the invention, which as described above, may determine the location of substantially all targets within a defined range of the detector. After each target in the defined range is identified, its position is compared with the end of the defined range of interest, which could correspond to the bottom of a tank. All targets within the defined range that do not correspond to the liquid level are identified as bogus targets, and bogus target data relating to such targets is stored in memory. As a result of the automatic generation of bogus target data, the possibility of incorrect bogus target data due improper measurement of bogus targets or manual entry is eliminated.

In a fourth aspect, the invention is directed to a detector having two modes of operation, a first mode in which the first echo received after the transmission of an energy burst is considered to be the true echo, and a second mode in which the echo of the energy burst that has the largest magnitude is considered to be the true echo. In accordance with this aspect of the invention, echo data comprising time-of-receipt data and magnitude data is stored in a plurality of memory locations. If the detector is operating in the first mode of operation, the detector searches the contents of the memory locations to determine which of a plurality of echoes was the first echo that was received. That echo is considered to be the true echo. If the detector is operating in the second mode of detection, the detector searches the contents of the memory locations to determine which of the echoes had the largest magnitude. In this mode, the echo having the largest magnitude is considered to be the true echo.

This aspect of the invention is advantageous in that it allows an operator to determine whether the detector should respond to either the first echo received after the transmission of an energy burst, or the echo having the largest magnitude. Depending upon the characteristics of a tank and other factors such as the location of the detector with respect to the tank, true echoes may be the echoes that are either received first or have the largest magnitude. After the operator has determined which is the case from experience with the particular tank or type of tank for which the detector is used, the operator can select the proper mode of operation.

A fifth aspect of the invention relates to a method of setting the gain of a detector. The method begins by retrieving a gain value from a memory location and storing the gain value in a temporary memory location. An energy burst is transmitted, and an electrical echo signal is generated in response to receiving an echo of the energy burst. The echo signal is amplified by an amount determined by the gain value stored in the temporary memory location. The gain value in the temporary memory location can be adjusted upwards or downwards in accordance with gain-adjustment commands entered by an operator. Energy bursts are continuously transmitted until the gain is correct, which is indicated by a gain-correct signal generated in response to a command entered by the operator. The method of adjusting the gain may also include a step which requests an access code from the operator to prevent unauthorized adjustment of the gain. The method may also be used to adjust other electrical parameters.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 2b is a diagram of two waveforms generated in the zero-crossing detector circuit of FIG. 2a;

FIGS. 7a–7b illustrate a number of gain lines that are generated during the operation of the preferred embodiment;

FIGS. 9a–9d illustrate various memory locations used during the operation of the preferred embodiment;

FIG. 15 is a flowchart of a trim routine used to adjust several gain values used in the preferred embodiment.

DETAILED DESCRIPTION OF A PREFERRED EMBODIMENT

Figure 1:
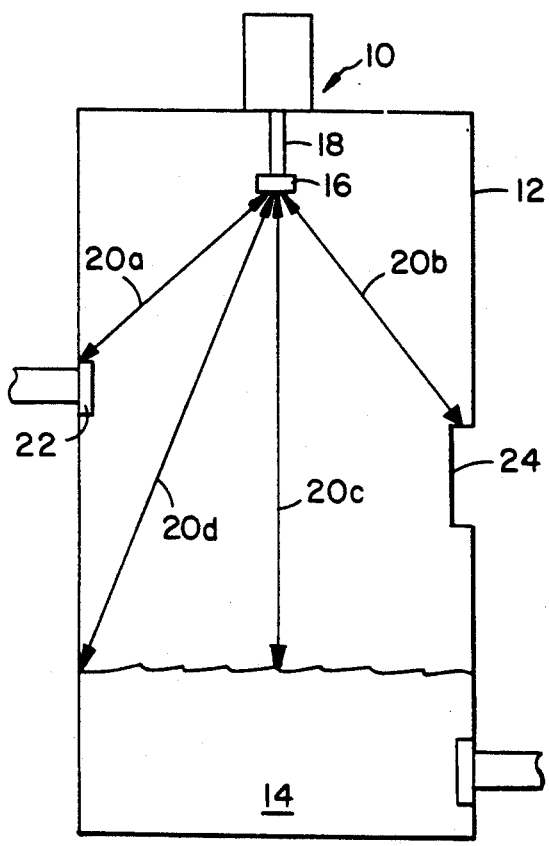
FIG. 1 is a schematic view of an ultrasonic detector in accordance with the invention attached to a container.

Referring to FIG. 1, a detector 10 in accordance with the invention is shown fixed to a container 12, such as a tank, containing a liquid 14. The detector 10 includes an ultrasonic transducer 16 connected via a shaft 18. The transducer 16, when triggered, periodically emits bursts of ultrasonic energy which are transmitted into the interior of the tank 12 and reflected back to the transducer 16 by various surfaces within the tank 12. The reflected ultrasonic energy, or echoes, are converted by the transducer 16 to electrical signals. From these signals, the detector 10 determines the time between the transmission of the ultrasonic energy and receipt of the echoes.

As shown in FIG. 1, there are four energy paths between the transducer 16 and various internal surfaces within the tank 12 that would produce echoes: a first path 20a associated with a pipe collar 22, a second path 20a associated with a tank portion 24 having a reduced diameter, a third path 20c associated with the liquid surface, and a fourth path 20d associated with the intersection of the liquid surface and the tank wall. The echoes received by the transducer 16 associated with these four energy paths 20 would have different magnitudes and would be received at different times.

Figure 1A:
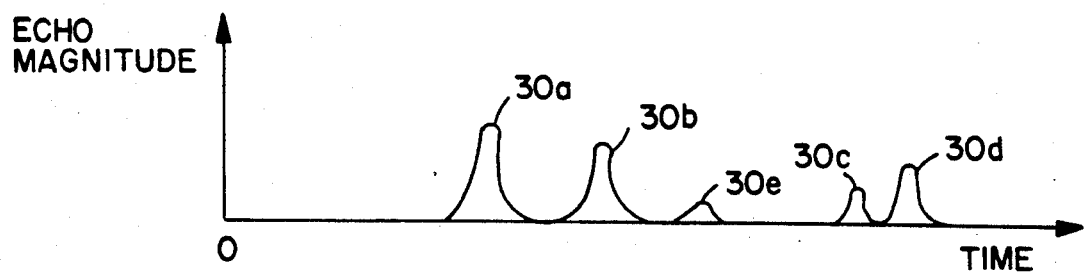
FIG. 1a is a diagram of the time relationship of a number of echoes received by the detector of FIG. 1.

A graph of the position and magnitude of four echoes 30a, 30b, 30c, 30d, associated with the four energy paths 20a, 20b, 20c, 20d, respectively, is shown in FIG. 1a. An additional echo 30e, which does not correspond to any energy path, is also shown. The echo 30e might be generated by electrical interference or noise caused, for example, by the start of a pump located adjacent the tank. Generally, the magnitude of the echoes decreases with time, since ultrasonic energy is attenuated as it travels through the atmosphere. However, the magnitude of the echo 30d is greater than that of the echo 30c since the intersection of the liquid surface and tank wall may be a better ultrasonic reflector than the surface of the liquid alone.

The echoes 30a and 30b are referred to herein as "bogus" echoes since they correspond to internal tank structure. The echoes 30d and 30e are referred to as "spurious" echoes, while the echo 30c is referred to as the "true" cho. The main difference between the terms "bogus" and "spurious" echoes as used herein is that bogus echoes correspond to a fixed tank level whereas the position of spurious echoes may vary. It should be appreciated that the echoes 30 are shown only schematically in FIG. 1a, and that their actual shape is different.

As described in detail below, the ultrasonic detector 10 is capable of selecting the echo 30c as the true echo corresponding to the liquid surface. As a result, the detector 10 may accurately determine the location of the liquid surface despite the existence of internal tank structure.

While the detector 10 is positioned in FIG. 1 to detect the liquid level, it is also capable of detecting liquid flow. Detecting flow could be accomplished by detecting the height of liquid at the gauging point of a flume or weir, which is a well-known, conventional manner of detecting flow. The detector 10 can also detect the presence of objects or substances other than liquids, such as grain for example.

Figure 2:
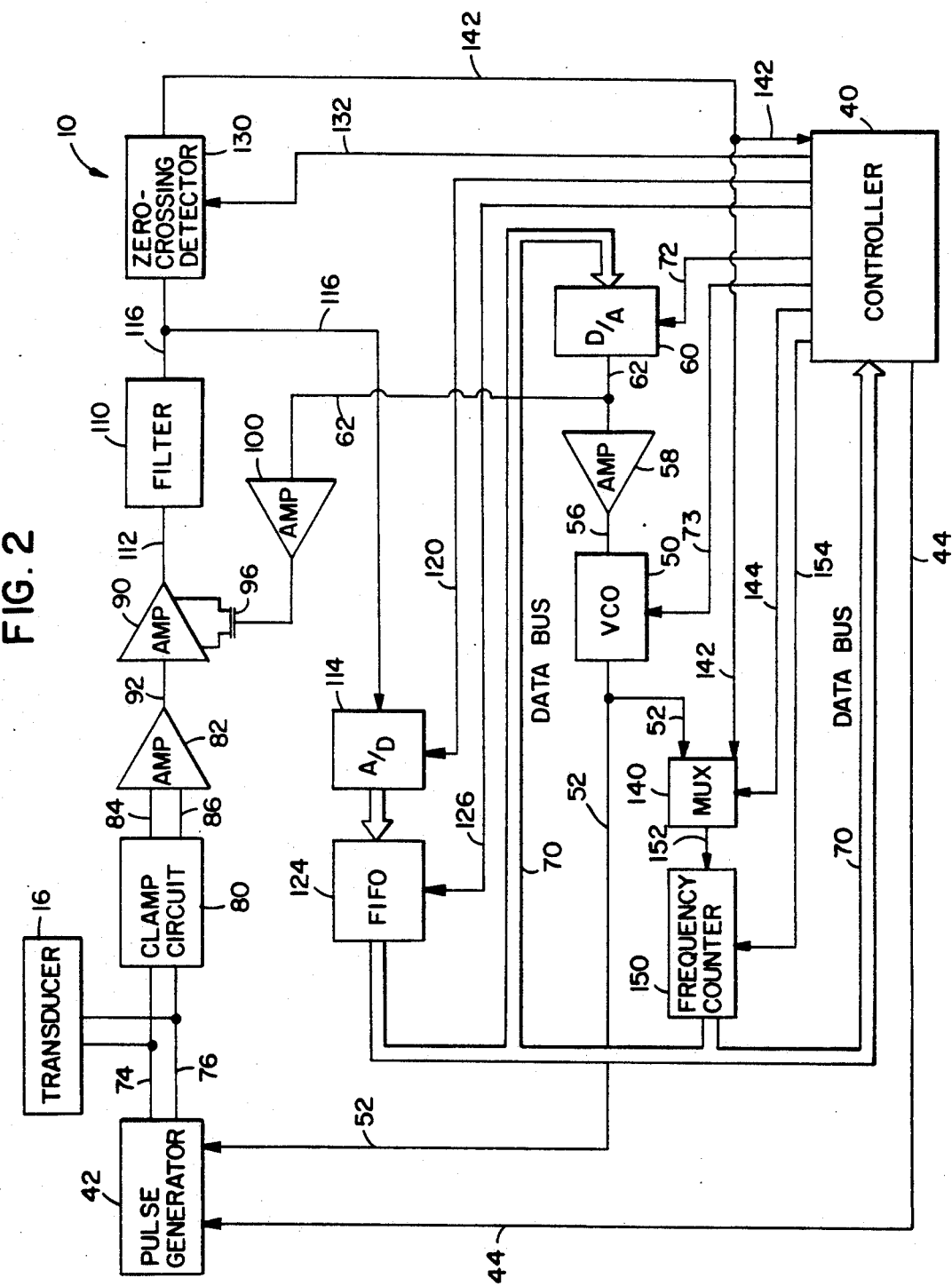
FIG. 2 is a block diagram of the electronics of the detector of FIG. 1.

A block diagram of the electronics of the detector 10 is shown in FIG. 2. The overall operation of the detector 10 is controlled by a controller 40, which may include any conventional microprocessor, data memory, software program memory, and associated interface circuits. The controller 40 has a programmable read-only memory (PROM) (not shown) in which a computer program is stored. The computer program, which is described in detail below, controls the operation of the detector 10.

The transducer 16 is periodically excited with electrical pulse trains transmitted from a pulse generator 42. The electrical pulses in the trains can have either a relatively high magnitude or a relatively low magnitude, as determined by a logic signal provided to the pulse generator 42 from the controller 40 via a line 44.

The frequency of each pulse train is controlled by a voltage-controlled oscillator (VCO) 50, which is connected to the pulse generator 42 via a line 52. This frequency may be generally in the range of 40 kHz to 50 kHz. The frequency at which the VCO 50 oscillates, and thus the frequency of the electrical pulse train, is determined by an analog voltage provided to the VCO 50 via a line 56. The analog voltage is generated by an amplifier 58 that is connected to a digital-to-analog (D/A) converter 60 via a line 62. The D/A converter 60 is connected to the controller 40 via a data bus 70 and has an enable line 72. The controller 40 controls the frequency at which the VCO 50 oscillates by sending an appropriate multi-bit digital signal to the D/A converter 60, which converts the digital signal to a corresponding analog voltage and supplies the analog voltage to the VCO 50 via the line 56. This analog voltage is a relatively low-level signal, which may vary between seven and nine volts, for example.

The duration of each pulse train generated by the VCO 50 is controlled by a logic signal, or "transmit gate," generated by the controller 40 and provided to the VCO 50 via a line 73.

Upon receiving a pulse train from the VCO 50, the pulse generator 42 transmits to the transducer 16 either a relatively high- or relatively low-amplitude pulse train via a pair of line 74, 76. The pulses transmitted to the transducer 16 are on the order of several hundred volts. In response to receiving a pulse train on the lines 74, 76, the transducer 16 generates a corresponding burst of ultrasonic energy and transmits the burst to the interior of the tank 12. Any echoes of the energy burst that are received by the transducer 16 are converted by the transducer 16 back into electrical signals and provided on the lines 74, 76. Electrical ringdown signals generated by the transducer 16 are also provided on the lines 74, 76 immediately following the transmission of an energy burst.

The lines 74, 76 are provided to a signal processing circuit that includes a clamp circuit 80, a fixed-gain amplifier 82 coupled to the clamp circuit 80 via a pair of lines 84, 86, and a variable gain amplifier 90 connected to the amplifier 82 via a line 92. The clamp circuit 80 reduces the magnitude of any electrical signals provided to the amplifier 82 via the lines 84, 86 to about 0.5 volt. The main purpose of the clamp circuit 80 is to prevent the high-voltage pulses generated by the pulse generator 42 from damaging the amplifiers 82, 90. The clamp circuit 80 does not substantially affect the electrical signals generated by the transducer 16, which correspond to echoes, since those electrical signals are typically smaller than 0.5 volt.

The variable-gain amplifier 90 provides great flexibility in controlling the magnitude of the electrical signals received from the transducer 16. The gain of the amplifier 90 is determined by a control voltage provided to the gate of a field-effect transistor (FET) 96 connected to the amplifier 90. The control voltage, which acts to vary the resistance across the source and drain terminals of the FET 96, is generated by an amplifier 100 connected to the D/A converter 60 via the line 62. The controller 40 controls the gain of the amplifier 90 by providing the D/A converter 60 with a multi-bit digital signal. The digital signal is converted by the D/A converter 60 to an analog voltage, which is provided to the amplifier 100 that generates the gain control voltage. The single D/A converter 60 may be used to control both the VCO 50 frequency and the amplifier 90 gain since those values are never set simultaneously.

The electrical signal amplified by the amplifier 90 is provided to a bandpass filter 110 via a line 112. The bandpass filter 110 may comprise an active filter, such as a high-pass amplifier filter coupled to a low-pass amplifier filter. The output of the filter 110 is provided to an analog-to-digital (A/D) converter 114 via a line 116. As described in more detail below, the A/D converter 114 samples the electrical echo signal provided on the line 116 at a relatively high rate within a relatively narrow time period, referred to herein as a "conversion gate." The conversion gate, which is controlled by a logic signal provided to the A/D converter 114 by the controller 40 via a line 120, is generated when an echo signal is expected. The A/D converter 114 converts the analog samples to multi-bit digital form and stores the digital signals in a first-in-first-out (FIFO) memory 124 controlled by the controller 40 via a line 126. The digitized samples of the echo signal are transmitted to the controller 40 via the data bus 70.

The A/D converter 114 and the D/A converter 60 shown schematically in FIG. 2 may be implemented on a single integrated circuit chip such as an AD7569 commercially available from Analog Devices, Inc.

The electrical signal output from the filter 110 via the line 116 is also provided to a zero-crossing detector 130. The zero-crossing detector 130 performs several functions. One of these functions is to generate a zero-crossing signal indicative of the frequency of the ringdown signal generated on the line 116 immediately following the transmission of the energy burst. A second function is to generate a zero-crossing signal indicative of the frequency of the echo signal provided on the line 116. The third function is to generate an echo-detect signal when the magnitude of the echo signal surpasses a threshold voltage.

Figure 2A:
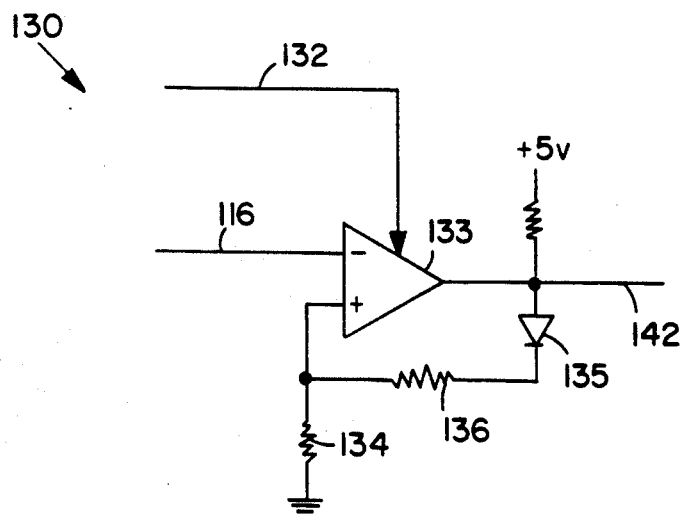
FIG. 2a is a circuit diagram of the zero-crossing detector schematically shown in FIG. 2.

A circuit diagram of one embodiment of the zero-crossing detector 130 is shown in FIG. 2a. The detector 130 comprises a comparator 133 having its inverting input connected to the line 116, its noninverting input connected to ground through a resistor 134, and its output connected to the line 142. A diode 135 and a resistor 136 are connected in series across the output and the noninverting input of the comparator 133 to provide hysteresis. When the output of the comparator 133 is high, or about five volts, the voltage at the noninverting input of the comparator is 300 millivolts (mv). When the comparator output is low, or zero volts, the voltage at the noninverting input is zero volts.

Figure 2B:
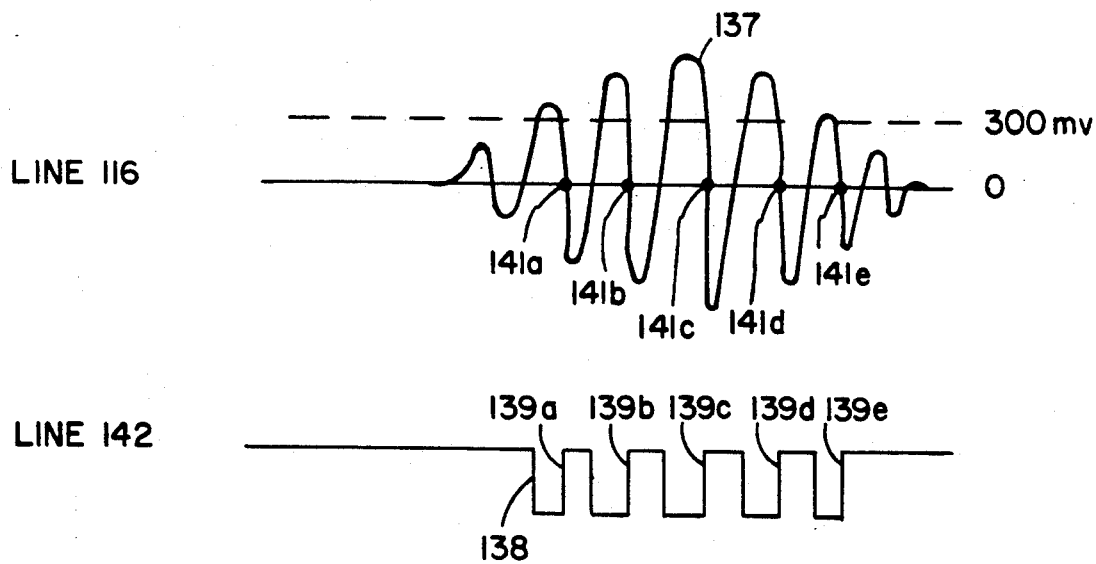

In operation, when the comparator 133 output is high, its output switches to low when the magnitude of the signal provided at its inverting input rises about 300 mv. When the comparator output is low, switches to high when the magnitude of the electrical signal provided to its inverting input falls below zero volts. This switching action is illustrated in FIG. 2b, in which an electrical echo signal 137 on the line 116 is shown with respect to the comparator 133 output on a line 142.

As can be seen, the first falling edge 138 of the signal on the line 142 is generated when the magnitude of the echo signal 137 first surpasses the 300 mv threshold. This falling edge is provided to the controller 40 via the line 142 to signal the controller 40 that an echo signal having a sufficient magnitude has been received. This is a general indication of the time of receipt of the echo. As described in more detail below, the precise time of receipt of the echo is generated by determining the peak of the echo, which occurs later in time.

The comparator output signal on the line 142 generates rising edges 139a–139e in response to the echo signal 137 falling below zero as indicated by points 141a–141e. The time difference between adjacent zero-crossing edges 139a–139e is used to determine the frequency of the echo signal 137 as described in more detail below. The frequency of the echo signal is one basis on which true echoes are distinguished from spurious echoes. As described in more detail below, if the frequency of a received echo signal does not substantially match the frequency at which the ultrasonic energy burst was transmitted, the corresponding echo is rejected as being a spurious echo.

The zero-crossing detector 130 is activated by a logic signal, or "frequency gate," provided by the controller 40 via a line 132. The frequency gate is opened for a portion of the duration of the received echo signal or ringdown signal sufficient to obtain at least one pair of zero crossings in order to determine the time period between two successive zero crossings.

Referring back to FIG. 2, the output of the zero-crossing detector 130 is provided to a multiplexer 140 via the line 142. When the frequency of either the ringdown signal or the received echo signal is determined, the controller 40 provides a select signal to the multiplexer 140 via a line 144 to cause the multiplexer 140 to pass the output of the zero-crossing detector 130 to a frequency counter 150 via a line 152. The frequency counter 150 generates a binary count corresponding to the time duration between two adjacent zero crossings. The actual time, and thus the frequency, is determined by the controller 40 from the binary count provided by the frequency counter 150. The binary count is transmitted from the counter 150 to the controller 40 via the data bus 70 when triggered by a logic signal provided to the frequency counter 150 by the controller 40 via a line 154.

The output of the VCO 50 is provided to the frequency counter 150 via the line 52 at certain time periods to measure the frequency of the pulse train generated by the VCO 50. As described in more detail below, the VCO output is periodically supplied to the frequency counter 150 so that the VCO frequency can be adjusted to match the ringdown frequency of the transducer 16.

OPERATION

The operation of the ultrasonic detector 10 is controlled by a computer program stored in the controller 40. The computer program comprises a number of routines, each of which is described in detail below. The routines may be implemented as subroutines, interrupt service routines, or any other type of routine or program. The precise form of each of the routines is not considered important in the practice of the invention.

Main Operating Routine

Figure 3A:
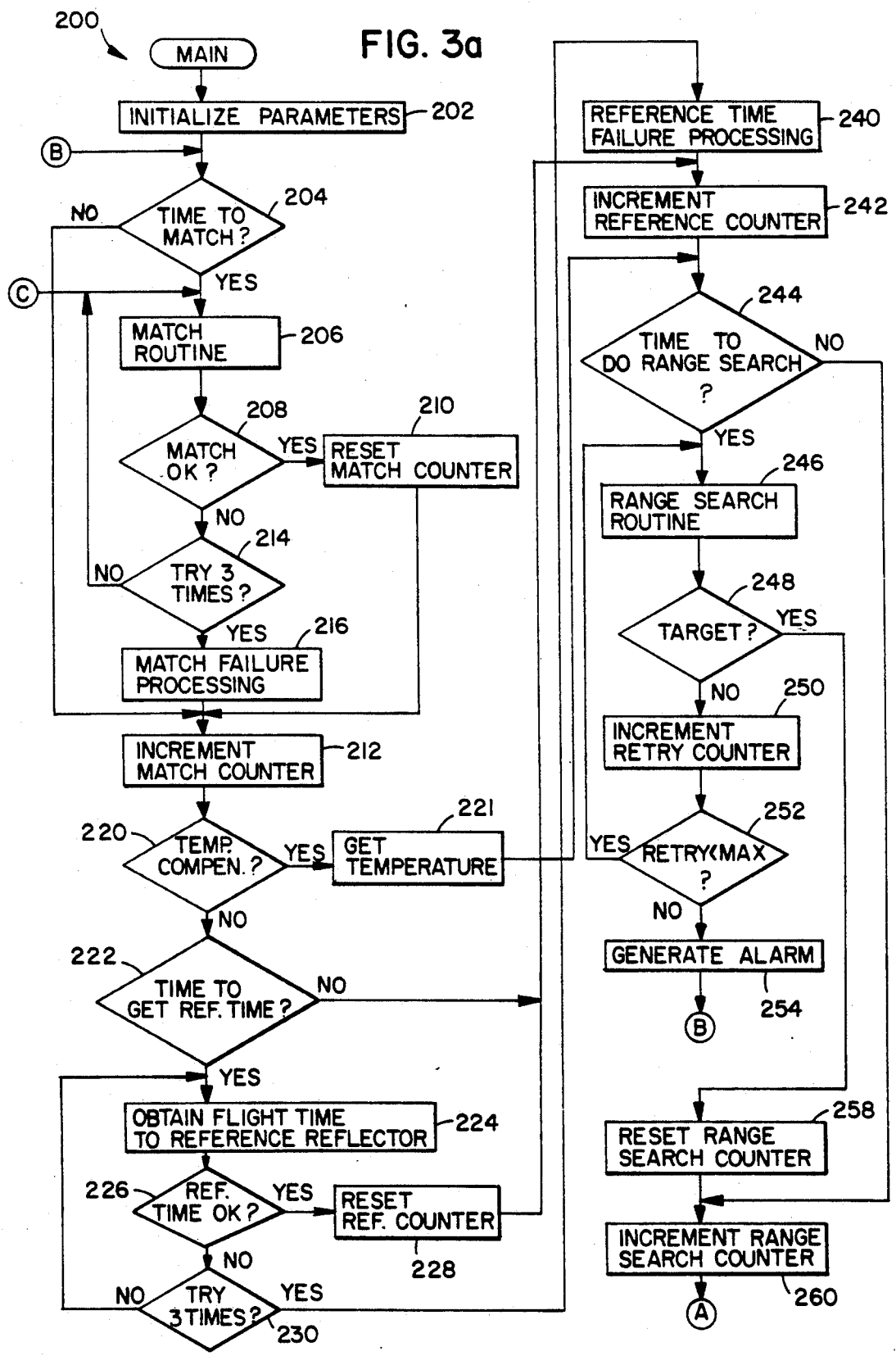
FIGS. 3a and 3b are a flowchart of the main operating routine of the computer program stored in the controller schematically shown in FIG. 2.
Figure 3B:
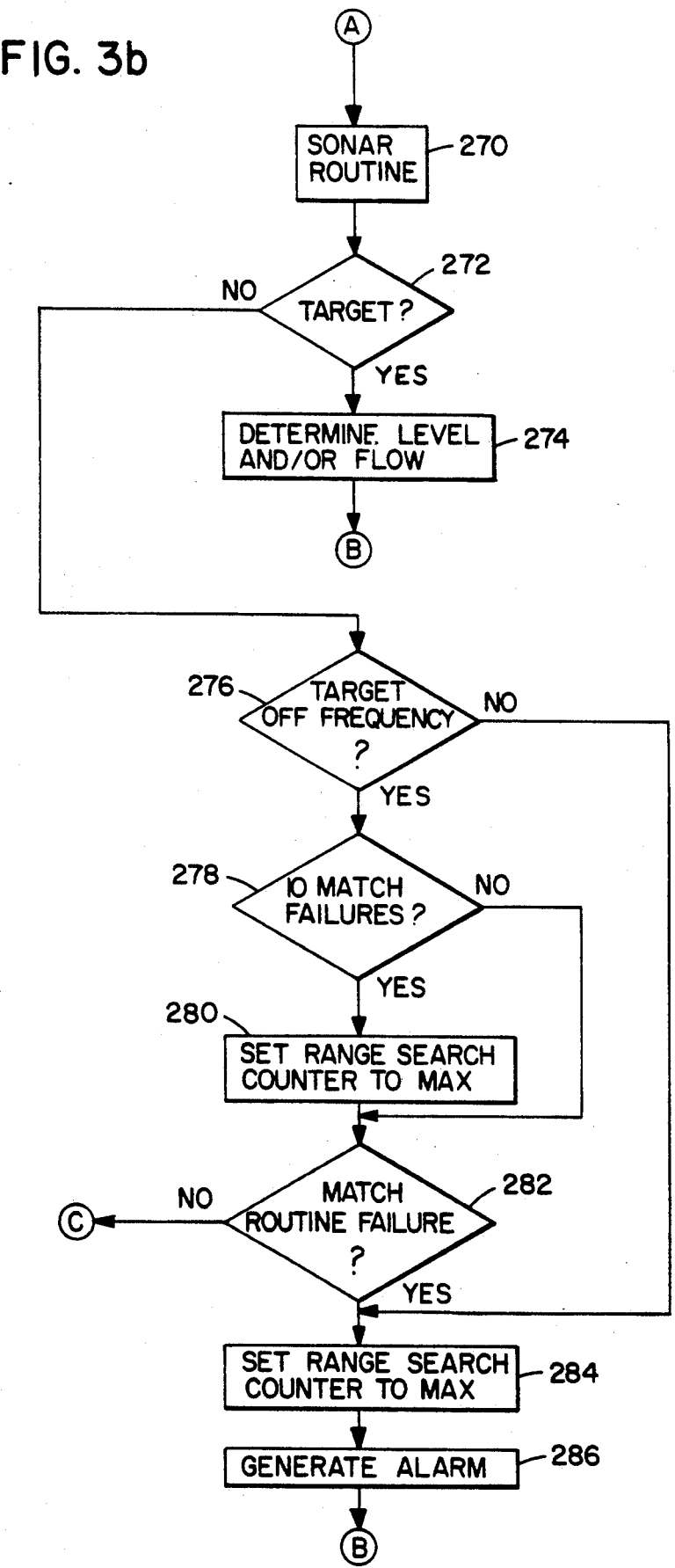

A flowchart of the main operating routine 200 is shown in FIGS. 3a and 3b. The main operating routine 200 controls the overall operation of the detector 10 and determines when the subordinate routines are executed. These subordinate routines, which include a frequency match routine, a range search routine, and a sonar routine, are described in detail below.

Now referring to FIG. 3a, the main operating routine begins at step 202 where various parameters are initialized. These parameters include a match counter associated with the frequency match routine, a range search counter associated with the range search routine, and a reference counter associated with obtaining a reference travel time. The status of each of these counters determines when the associated routine is executed by the main operating routine.

The main operating routine executes the routines associated with the counters at different rates. In particular, the match frequency routine is executed once every 50 times the main operating routine cycles through its main loop. The range search routine is only executed every 200 cycles, and the reference travel time is obtained only once every 20 cycles. However, unlike the other routines, the sonar routine is performed during each loop of the main operating routine.

Each time the main operating routine cycles through its main loop, it increments each of the counters associated with the respective routines. When any of the counters reaches its maximum count, the associated routine is performed. Upon completion of the routine, its counter reset to zero. Thus, for example, if the maximum count for one of the routines is 50, that routine will be performed once every 50 cycles of the main operating routine.

During the initialize parameters step 202, each of the counters is set to its respective maximum value to force each of the associated routines to be performed during the first execution of the main loop of the main operating routine.

At step 204 the match counter is read to determine if it is time for the match routine to be executed. If it is, the match routine is performed at step 206. As described in detail below, the match routine causes the frequency at which the ultrasonic energy burst is transmitted to substantially match the ringdown frequency of the transducer 16. If the match routine is successfully performed, at step 208 the program branches to step 210 where the match counter is reset to zero. The program then branches to step 212.

If the match routine was not successfully executed as determined at step 208, the program branches to step 214, where the program determines whether the match routine has been performed unsuccessfully three times. If not, the program branches back to step 206 where the match routine is again performed.

If the frequency match routine was attempted three times as determined at step 214, the program branches to step 216 where match failure processing is performed. This processing includes setting the match counter to one less than its maximum count to force re-execution of the match routine during the next loop of the main operating routine. In addition, the digital signal that is sent to the D/A converter 60 to control the VCO frequency, which is referred to herein as the "frequency vector," is set to its default value, which corresponds to an intermediate frequency. The program then branches to step 212.

At step 212, the match counter is incremented by one, and then the program branches to step 220, where the program determines whether temperature compensation is being used. The detector 10 uses either temperature compensation or reference-target compensation to account for variations in speed of the ultrasonic energy resulting from atmospheric conditions within the tank 12.

If temperature compensation is being used, the program branches to step 221 where the temperature is retrieved from a temperature sensor (not shown). The program then branches to step 244.

If reference target compensation is being used, the program branches to step 222 where it checks whether it is time to obtain the flight time to a reference reflector (not shown) by reading the reference counter. If so, the flight time to the reference reflector is obtained at step 224. The routine then branches to step 226, where the reference flight time is checked to determine whether it is within predetermined limits. If the reference flight time is satisfactory, the program branches to step 228 where the reference counter is reset to zero. If the flight time is not satisfactory, the program branches to step 230 where it determines whether three unsuccessful attempts to obtain the reference flight time have been made. If not, the routine branches back to step 224 to again try to obtain the flight time.

If three unsuccessful attempts to obtain the flight time have been made, the program branches to step 240 where reference time failure processing is performed. This processing includes setting the reference counter to one less than its maximum count to force re-execution of step 224 during the next cycle of the main operating routine 200. The failure processing also includes setting the flight time to the reference reflector to a default value. At step 242, the reference counter is incremented by one.

At step 244, the program determines whether it is time to execute the range search routine by reading the contents of the range search counter. As described in more detail below, the range search routine determines the position and magnitude of echoes within a defined range of the detector, whether the echoes are bogus echoes, spurious echoes, or true echoes. The range search routine also "classifies" the echoes to distinguish between the true echo and bogus echoes. If it is not time to perform the range search routine, steps 246-258 are skipped since they all relate to that routine.

The range search routine is performed at step 246, and the program branches to step 248 where it is determined whether the range search routine found a target. In normal operation, at least one target will be found since the liquid surface will generate an echo. If no target was found, the program branches to step 250 where a retry counter is incremented. At step 252, if the count of the retry counter has not reached its maximum value, the program branches back to step 246 so that the range search routine is executed again. If the retry counter has reached the maximum count at step 252, the program branches to step 254 where an alarm, such as a visual or audible alarm, is generated, and the program then branches back to step 204 to continue operation.

If a target was found as determined at step 248, the program branches to step 258 where the range search counter is reset. At step 260 the range search counter is incremented.

Now referring to FIG. 3b, the operation of the main operating routine 200 continues at step 270 where the sonar routine is executed. It should be appreciated that there is no counter that determines when the sonar routine is executed. This is because the sonar routine is performed each time the main operating routine cycles through its main loop.

The sonar routine transmits 20 energy bursts to generate average target data for the one true target that was identified during the range search routine. This average target data is then used to ensure that the target that was located is the true target. If the true target was detected as determined at step 272, the program branches to step 274 where the liquid level and/or flow is determined. The program then branches back to step 204 for the next execution of the main loop of the main operating routine.

If the true target was not detected as determined at step 272, the program branches to step 276 where the reason for no true target being detected during the sonar routine is checked.

As described below, the sonar routine checks the frequency of the received echo signal to make sure it is substantially the same as the frequency at which the corresponding energy burst was transmitted. If the two frequencies do not match, then the echo signal is not considered to correspond to the true target, but is considered to be a spurious echo signal.

If the reason that no true target was found was not due to frequency mismatch, the program branches to step 284 where the range search counter is set to its maximum value to force execution of the range search routine during the next cycle of the main operating routine.

If no true target was found because of frequency mismatch, the program branches to step 278 where it is determined whether there have been 10 such failures. If there have been 10 match failures, the program branches to step 280 where the range search counter is set to its maximum value to force a range search during the next cycle of the main operating routine. If there have not been 10 match failures, the program skips step 280.

At step 282, the program determines whether there was a previous failure of the match routine. If there was no match routine failure, the program branches to step 206 where the match routine is again performed. If there was a match routine failure, the program branches to step 284, where the range search counter is set to its maximum value. The program then proceeds to alarm state 286, after which the program branches to step 204.

Frequency Match Routine

The purpose of the frequency match routine is to match the frequency at which energy bursts are transmitted to the ringdown frequency of the transducer 16. This is done because a transducer is more efficient at converting electrical pulses to ultrasonic energy and vice versa at its ringdown frequency.

During the first portion of the frequency match routine, 40 energy bursts are transmitted and the frequency of the 40 corresponding ringdown signals is determined. The 40 frequency samples are then averaged to get an average ringdown frequency. The frequency at which the energy bursts are transmitted, which is controlled by the VCO 50, is then adjusted so that it is substantially the same as the average ringdown frequency.

Figure 4A:
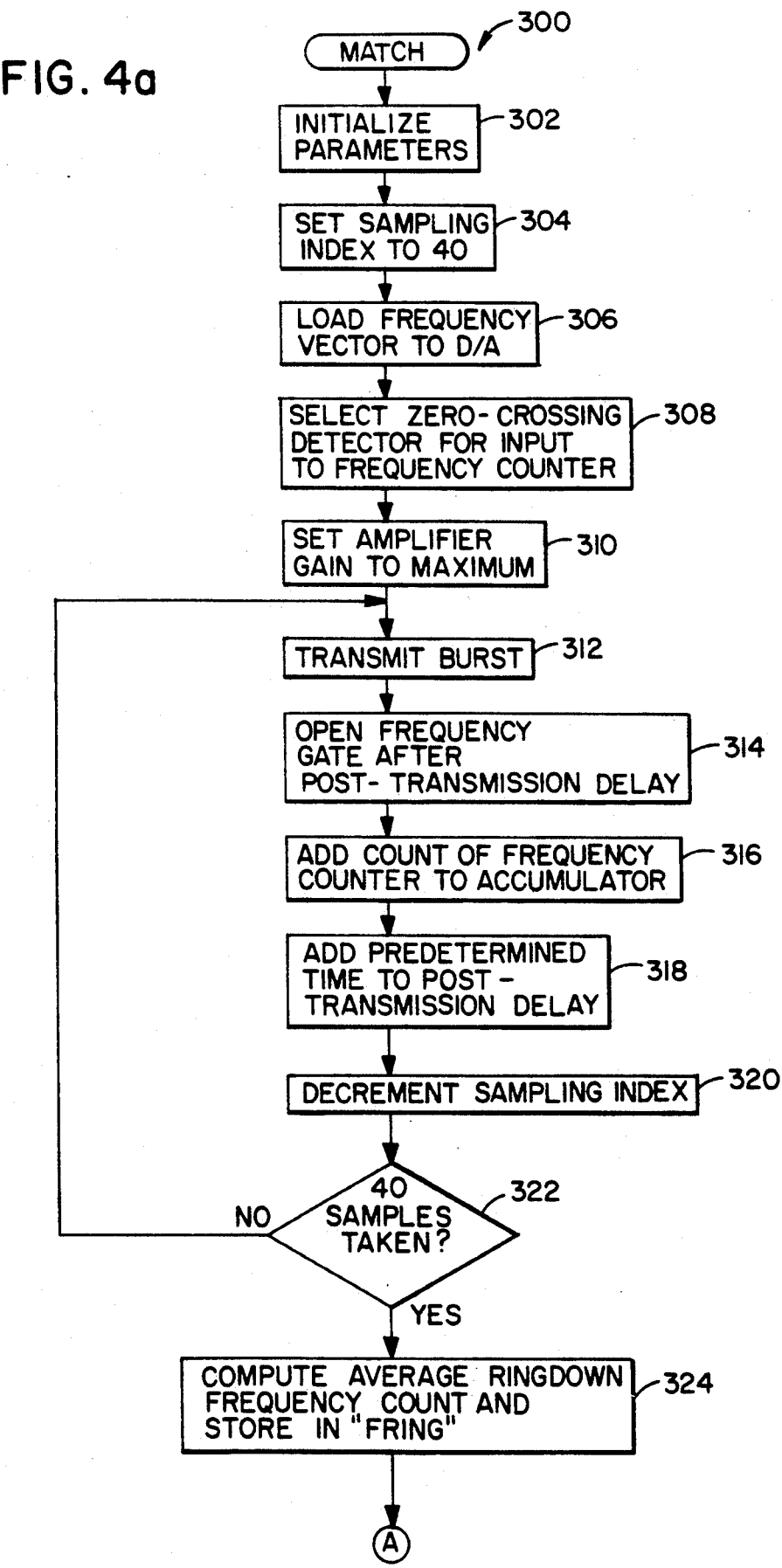
FIGS. 4a and 4b are a flowchart of a frequency match routine schematically shown in the main operating routine of FIGS. 3a and 3b.
Figure 4B:
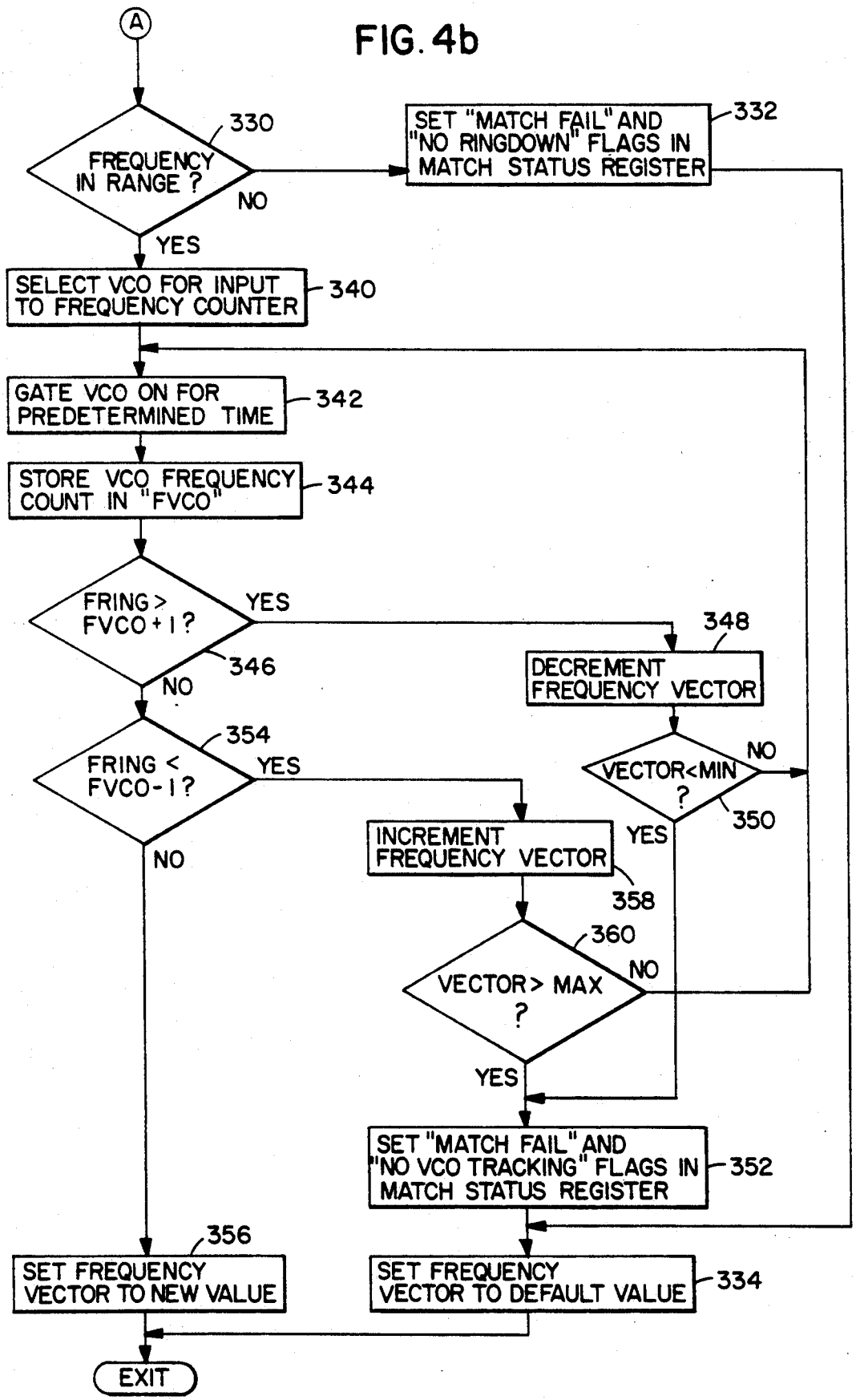
Figure 5:
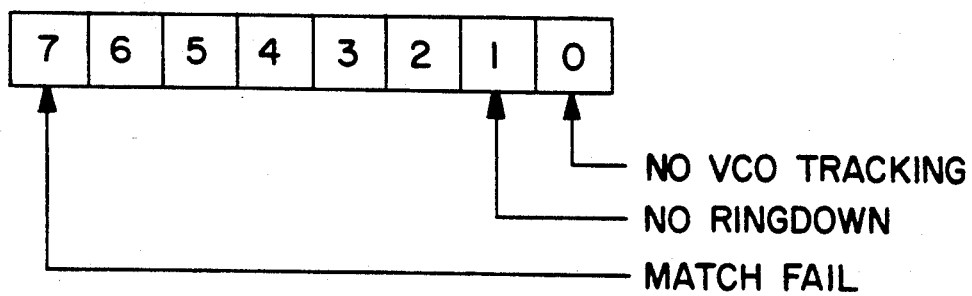
FIG. 5 illustrates a match status register used by the frequency match routine of FIGS. 4a and 4b.

A flowchart of the frequency match routine 300 is shown in FIGS. 4a and 4b. Referring to FIG. 4a, the routine begins execution at step 302 where several parameters are initialized. These parameters include a match status register shown in FIG. 5. The match status register is an eight-bit register, three bits of which are used as flags to indicate three conditions. Bit 0 is used as a "no VCO tracking" flag that is set when the frequency match routine is unable to adjust the frequency of the VCO 50 to match the average ringdown frequency. Bit 1 is used as a "no ringdown" flag that is set when the ringdown frequency of the transducer 16 does not fall within its expected range. Bit 7 is used as a "match fail" flag and is set when either bit 0 or bit 1 is set.

Figure 6:
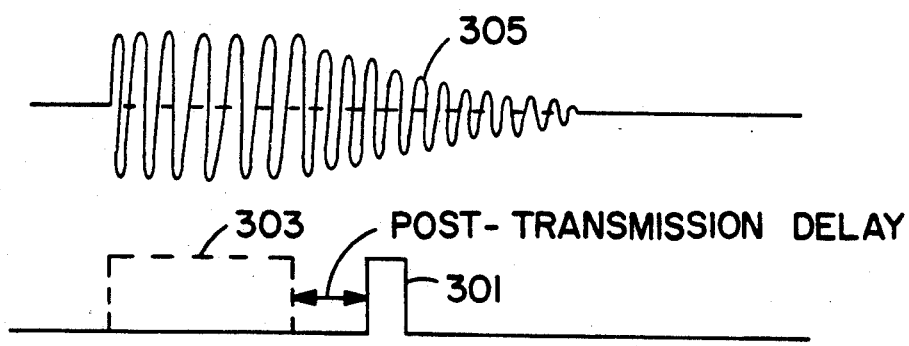
FIG. 6 is a diagram of several waveforms generated during the operation of the preferred embodiment.

The other parameter that is initialized during step 302 is a post-transmission delay period. Referring to FIG. 6, the ringdown frequency is measured with the use of a predetermined time interval 301, or "frequency gate." The frequency gate 301 opens after the post-transmission delay period, which is defined as the time period between the end of the transmission gate 303 and the beginning of the frequency gate 301. As described in more detail below, the frequency of the ringdown signal 305 is measured during the time interval defined by the frequency gate 301.

The ringdown frequency is measured by the frequency counter 150 in the following manner. The first zero crossing occurring within the frequency gate starts the counter 150, and the second zero crossing occurring within the gate stops the counter 150. The binary count so generated is directly proportional to the time between zero crossings, and inversely proportional to the frequency of the ringdown signal. Thus, a larger count corresponds to a relatively lower frequency than a smaller count. Each of the counts of the counter 150 corresponds to about 50 Hz. The actual determination of the frequency during the frequency match routine is not necessary since all actions may be taken on the basis of the binary counts themselves.

Referring back to FIG. 4a, at step 304 a sampling index is set to 40 since 40 samples of the ringdown frequency are taken. The sampling index, which is decremented by one after each sample is taken, is used to determine when the sampling is completed.

At step 306, the current frequency vector is sent by the controller 40 to the D/A converter 60. The frequency vector, which is a multi-bit digital signal, is converted by the converter 60 to an analog voltage that determines the frequency at which the VCO 50 oscillates. A new value of the frequency vector is determined each time the frequency match routine is executed. When the routine is first executed, the frequency vector is set to a predetermined value.

At step 308, the output of the zero-crossing detector 130 is selected for input to the counter 150 by means of the select signal provided by the controller 40 on the line 144 to the multiplexer 140. At step 310, the gain of the amplifier 90 is set to its maximum value to ensure that the zero-crossing detector 130 generates a zero crossing each time the falling portion of the echo signal crosses through the zero axis.

Steps 312-322 are repeated each time a sample of the ring is taken. At step 312 an energy burst is transmitted. At step 314, the frequency gate is opened after the completion of the post-transmission delay. At step 316, the count generated by the frequency counter 150 is added to an accumulator that stores the sum of the counts generated during all 40 samples. At step 318, a relatively small predetermined period of time is added to the post-transmission delay period in order to slightly shift the frequency gate. The purpose of shifting the frequency gate is to ensure that a relatively broad portion of the ringdown signal is sampled. At step 320, the sampling index is decremented, and at step 322 the program branches back to step 312 if all the samples have not been taken.

At step 324 the average ringdown frequency count is determined by dividing the sum of the counts stored in the accumulator by the number of frequency samples that were taken. The average count is stored in a FRING variable.

Referring to FIG. 4b, at step 330 the program determines whether the average ringdown frequency is in its expected range by determining whether the average ringdown count is between a maximum count and a minimum count. If the ringdown frequency is not in the expected range, the program branches to step 332 where the "match fail" and "no ringdown" flags are set in the match status register. The program then branches to step 334 where the frequency vector is set to an intermediate default value.

If the average ringdown frequency is in its expected range as determined at step 330, the program branches to step 340. The purpose of steps 340-356 is to set the VCO frequency, and thus the frequency at which ultrasonic energy bursts are transmitted by the transducer 16, to match the average ringdown frequency. At step 340, the VCO 50 is selected for input to the frequency counter 150 via the multiplexer select line 144.

At step 342, the VCO 50 is gated on for a predetermined period of time. When the VCO is gated on, the first pulse edge it generates starts the frequency counter 150 and the next pulse edge stops the counter 150. Thus, the binary count generated by the counter 150 relates to the VCO frequency the same way that the zero crossings relate to the ringdown frequency as described above. At step 344 the VCO frequency count is stored in a FVCO variable.

Step 346 determines whether the average ringdown frequency count stored in FRING is greater than one more than the FVCO count. If it is, then the frequency of the VCO 50 needs to lowered. Accordingly, the program branches to step 348 where the frequency vector is decremented. At step 350, the value of the frequency vector is compared to a minimum value. If the frequency vector is less than the minimum, the program branches to step 352 where the "match fail" and "no VCO tracking" flags are set in the match status register. The program then proceeds to step 334 where the frequency vector is set to its intermediate default value.

If the decremented frequency vector was not less than the minimum value as determined at step 350, the program branches back to step 342 in order to measure the VCO frequency with the new value of the frequency vector.

If the average ringdown frequency count stored in FRING is not greater than one more than the FVCO count as determined at step 346, the program branches to step 354 where the FRING count is tested to determine whether it is less than one less than the FVCO count. If it is, then the frequency of the VCO needs to increased. Accordingly, the program branches to step 358 where the frequency vector is incremented.

At step 360, the value of the frequency vector is compared to a maximum value. If the frequency vector is greater than the maximum, the program branches to step 352 where the "match fail" and "no VCO tracking" flags are set in the match status register. The program then proceeds to step 334 where the frequency vector is set to its intermediate default value.

If the FRING and FVCO counts were within one count of each other as determined at steps 346, 354, the program will branch to step 356 where the frequency vector is set to the new value. The frequency match routine then terminates.

Range Search Routine

The purpose of the range search routine is to periodically identify and classify the targets within the desired range of interest. This range may be specified by the user, and might correspond to the depth of the tank 12, for example. The range search routine has two basic modes of operation, a search mode and a classification mode. In the search mode, the routine searches the entire range of interest to identify the targets within the range, which is preferably all or substantially all the targets within the range. In the classification mode, the routine analyzes the targets found during the search mode to identify the true target and any bogus targets. The position of the true target is then used to generate the conversion gate for the sonar routine to ensure that the sonar routine "tracks" the true target.

The operation of the search mode of the range search routine is explained in connection with FIGS. 7a-7d. Generally, the search mode identifies the targets within the range, whether true or bogus, by repeatedly transmitting energy bursts and gradually decreasing the gain after the transmission of each burst.

Referring to FIG. 7a, an illustration representing the operation of the search mode is shown. Each of the solid sloped lines in FIG. 7a, some of which are numbered 370a-370k, represents the system gain as a function of with respect to a single energy burst transmitted by the transducer 16. During operation, the transducer 16 transmits a first energy burst, and immediately following the transmission, the gain is reduced with time as indicated by the line 370a. The gain line 370a starts from an initial gain value and is shown to decrease linearly until it reaches a minimum gain value. Generally, the gain line 370a causes the detector 10 to detect any echoes that are received before the gain line 370a reaches the minimum gain value. As should be appreciated, the gain line 370a will only cause the detection of targets that are very close to the transducer 16.

After the first energy burst is transmitted and the associated gain reaches the minimum value, a second energy burst is transmitted, and the gain is decreased in accordance with a second gain line indicated by the gain line 370b. The gain line 370b has the same slope as the gain line 370a, but it starts with an initial gain value higher than that of gain line 370a. Due to the gain line 370b, the transducer 16 will detect any targets that are slightly farther away from, but still relatively close to, the transducer 16.

After transmission of the third burst, the gain line 370c is used. This gain line is slightly different from the gain line 370b in that the initial portion of the gain line 370b is flat. This is because the gain is held to a maximum threshold value for a predetermined period of time following the transmission of a burst. This time, which is indicated in FIG. 7a by an arrow 372, corresponds to a distance referred to herein as the "immediate field" of the transducer 16.

The above process is repeated by transmitting an energy burst, and gradually decreasing the gain in accordance with the next gain line shown in FIG. 7a. A slight change in the process occurs when the initial gain value of the next gain line reaches a predetermined maximum value. This occurs with the gain line 370d, and is shown by the dotted extension of the line 370d extending through the point T, which represents the point in time immediately following transmission of a burst. All gain lines subsequent to the line 370d have the same initial gain value, which is equal to the maximum gain, but their slopes gradually increase to zero, or approach horizontal. The difference in slope between adjacent gain lines may be a constant difference.

Some of the gain lines are shown to terminate at a vertical dotted line 374, which corresponds to the end of the range of interest. The detector 10 stops looking for targets beyond that range. The slope of the gain lines gradually increases until it reaches zero, as indicated by the gain line 370k.

Two targets are schematically represented in FIG. 7a as points A and B. During the search mode described above, target A will be detected with the use of the gain line 370g. The gain line 370f will not detect target A since the gain is not great enough at that point.

During the search mode, the gain lines are altered upon the detection of a target. This is explained in connection with FIG. 7b. After target A is detected, the next gain line 370h is limited to the gain at which target A was detected for a period of time starting after the gain is allowed to increase beyond the gain threshold value and ending a very short time after the time at which target A was detected. This period of time is illustrated by the horizontal line 376 in FIG. 7b. Target B is detected by the gain line 370i.

Referring to FIG. 7c, the two gain lines 370j and 370k are shown after the detection of target B. These gain lines are both limited to the gain at which target B was detected for the period of time designated by horizontal line 378. The search mode ends when the horizontal gain line 370k reaches the end of the range of interest indicated by the line 374.

Although the gain lines shown in FIGS. 7a-7c are shown as straight lines, it should be appreciated that the actual shape of the lines may be different. For example, the gain lines may decrease in a nonlinear fashion, such as exponentially decreasing for example, or they may decrease in stepped fashion, such as the gain lines shown in FIG. 7d.

The gain lines in FIG. 7d are generated by periodically decreasing the gain by discrete amounts at synchronous intervals. Two gain lines having stepped shapes like those shown in FIG. 7d have the same "slope" when the gain for each line is periodically reduced by the same discrete amount. Two stepped gain lines have different "slopes" when the gain of one of the gain lines is periodically reduced by a discrete amount that is different than the discrete amount by which the other gain line is periodically reduced. Thus, the gain lines 180a, 180b shown in FIG. 7d have the same "slope," whereas the gain lines 180c, 180e have different "slopes."

A gain line having a stepped shape is considered to have zero "slope" when the gain is not reduced during its generation. The gain line 180f shown in FIG. 7d has zero slope.

The shape of the gain lines is not critical. It is only necessary that the gain lines should be generally decreasing in amplitude with time so that the various targets in the range of interest of the detector will be detected with different gain lines.

Figure 8:
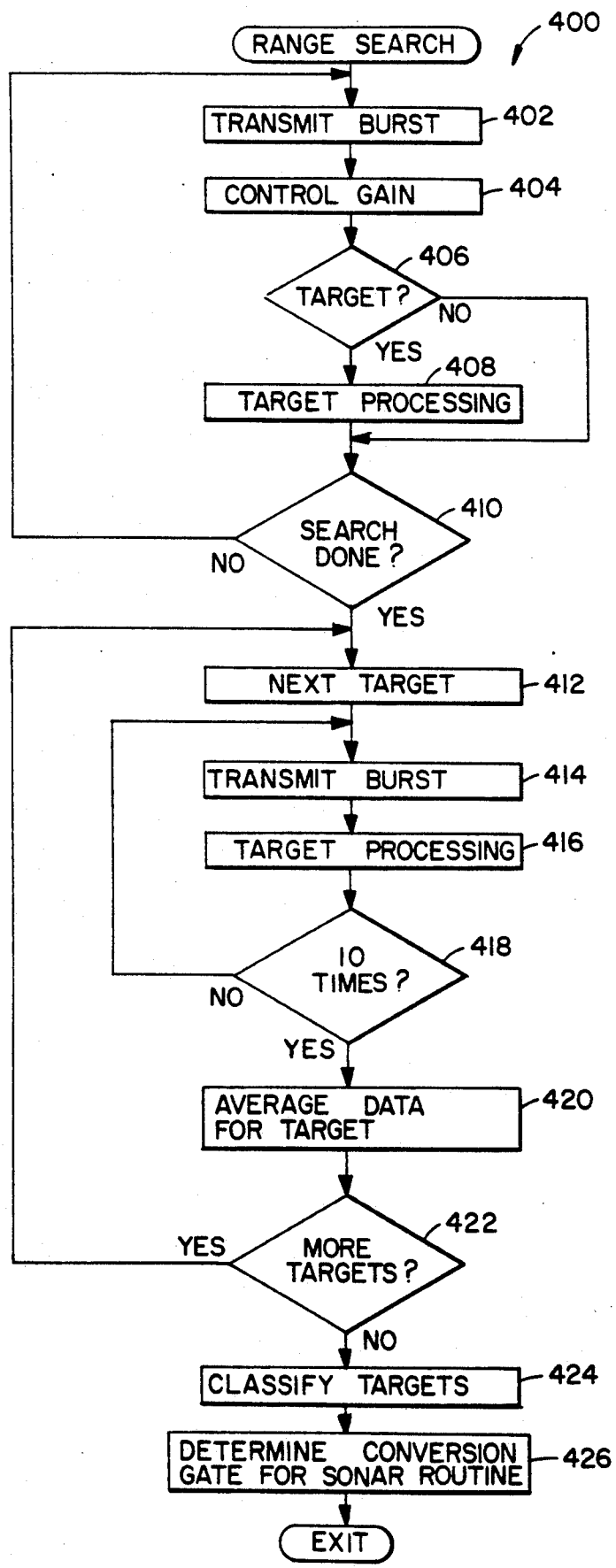
FIG. 8 is a general flowchart of a range search routine schematically shown in the main operating routine of FIGS. 3a and 3b.

A general flowchart of the operation of the range search routine 400 is shown in FIG. 8. This general flowchart is provided in addition to the detailed flowchart shown in FIGS. 10a-10f to aid in understanding the operation of the preferred embodiment. The steps in the general flowchart do not necessarily correspond directly to the steps in the detailed flowchart.

Referring to FIG. 8, the search mode of the range search routine 400 is accomplished by steps 402-410. As described above, during this mode the targets within the range of interest are detected and identified, regardless of whether they are valid, spurious, or bogus targets. At step 402, an energy burst is transmitted by the transducer 16. At step 404, the gain is controlled to generate a first gain line, such as the gain line 180a shown in FIG. 7d for example. If a target is detected when the first gain line is being generated, the program branches to step 408 where target processing is performed.

The target processing includes storing in a memory buffer in the controller 40 the target "travel time,"

which in this case is the time between the end of transmission of the burst of energy and the detection of the echo signal surpassing a predetermined magnitude. This memory buffer is referred to herein as the "search buffer" and is illustrated in FIG. 9a designated with the numeral 405. The contents of the search buffer 405 are shown to correspond to the five targets of FIG. 1 and the five echo signals schematically shown in FIG. 1a.

If no target is detected during the generation of the first gain line, the program skips step 408 and proceeds to step 410, where the program determines whether the range search has been completed. The range search is considered to be complete when all of the gain lines have been completely generated. The detection of the completion of the search may be accomplished by detecting the completion of the last gain line, which has zero slope.

If not all the gain lines have been generated, the program branches back to step 402 where another energy burst is transmitted. At step 404 the next gain line is generated, and the program continues as described above.

When all of the targets have been detected and identified, the program proceeds to the classification mode, which is performed by steps 412-424.

During steps 412-422, data relating to each of the targets detected during the search mode is generated. This data is generated by sending out 20 energy bursts for each target stored in the search buffer 405. The total travel time for the 20 energy bursts is accumulated in an accumulator 407 shown in FIG. 9b; the total magnitude of the 20 echoes is accumulated in a second accumulator 409, which is also shown in FIG. 9b; and the total gain at which the 20 echoes were detected is stored in an accumulator 411.

The travel time determined during the classification mode is based on the precise time of arrival of the echo signals. The precise time of arrival is considered to be when the peak of the echo signal arrives at the detector as described in more detail below.

Figure 12A:
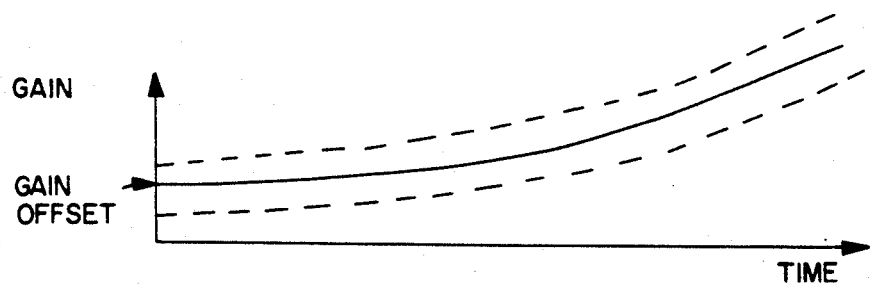
FIGS. 12a and 12b illustrate a number of waveforms that are generated during the operation of the preferred embodiment.
Figure 12B:
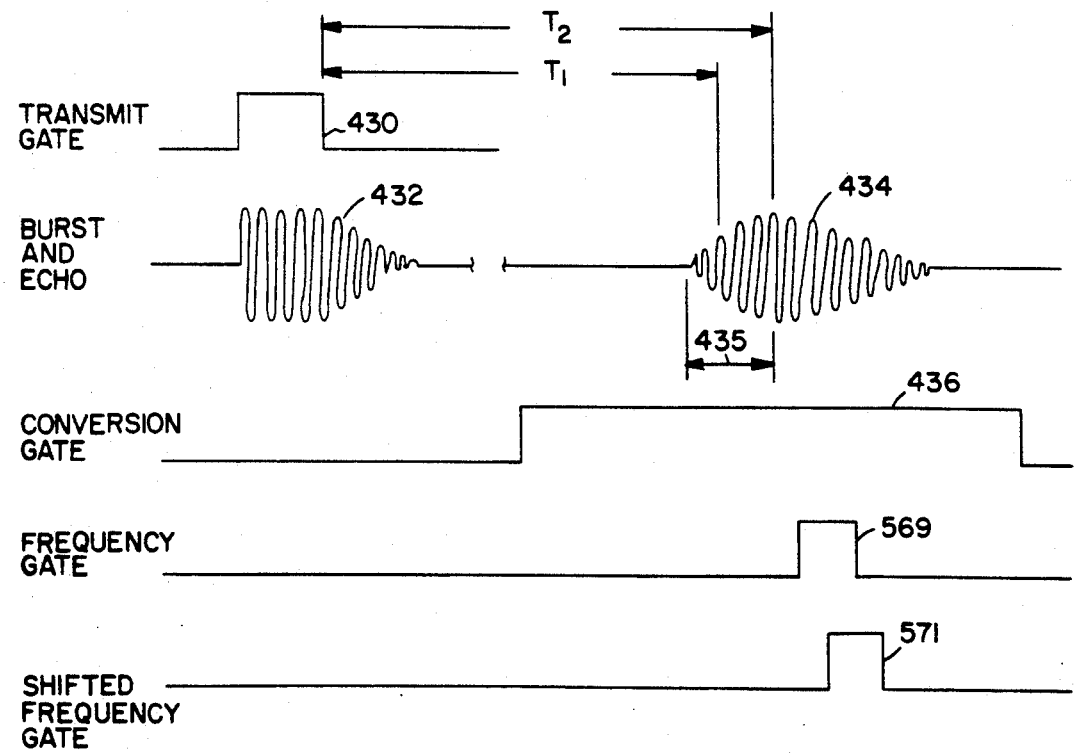

The distinction between the general arrival time and the precise arrival time of an echo signal is described in connection with FIG. 12b. FIG. 12b illustrates a transmit gate 430, an electrical signal 432 corresponding to an energy burst, an electrical echo signal 434, and a conversion gate 436. During the transmit gate 430, the energy burst 432 has a relatively constant magnitude. Immediately following the transmit gate 430, the energy burst 432 has a ringdown portion that gradually decreases in magnitude.

The echo signal 434 has a portion that gradually increases in magnitude to a peak, and then gradually decreases in magnitude. It is believed that the echo signal 434 increases in magnitude as long as the transmit gate 430 is open, reaches its peak at the precise time at which the transmit gate 430 ends, and then decreases after the end of the transmit gate 430. The duration of the increasing portion of the echo signal 434, which is indicated by an arrow 435, is approximately equal to the duration of the transmit gate 430, and the decreasing portion of the echo signal is somewhat longer than the transmit gate 430 due to the gradual decrease of the energy burst 432 due to ringdown. Thus, the duration of the echo signal 434 may be approximately 2-3 times the duration of the transmit gate 430.

The precise travel time of an echo corresponds to the time between the end of the transmit gate 430 and the peak of the echo signal 434. This precise travel time is indicated in FIG. 12b as time $T_2$.

The general travel time of the echo may be determined by computing the time between the end of the transmit gate 430 and the time when the echo signal 434 reaches a predetermined magnitude. The rise of the echo signal 434 to a predetermined magnitude is detected by the zero-crossing detector 130, which generates an echo-detect signal that is provided to the controller 40 via the line 142 to indicate the general arrival time of the echo. The general travel time of the echo is shown in FIG. 12b as time $T_1$.

The precise travel time is determined by repeatedly sampling the echo signal 434 at a relatively high rate during a period of time determined by the conversion gate 436.

When the conversion gate is high, the echo signal 434 on the line 116 is sampled at a relatively high rate. In the classification mode of the range search routine, 512 samples of the echo signal 434 are taken at rate of one sample every three microseconds. This sampling rate corresponds to about 333 kHz, or about 6 to 8 times the frequency at which energy bursts are transmitted, which is about 40 kHz to 50 kHz. The duration of the conversion gate 436 is about 1,500 microseconds; the duration of the transmit gate 430 is about 250 microseconds; and the duration of the echo signal 434 is about 500-1,000 microseconds.

Generally, the conversion gate 436 should be sufficiently wide to ensure that it is generated when the echo signal 434 is generated. However, it should not be made so wide so as to capture signals, such as noise or echo signals for example, other than the echo signal of interest.

In view of these competing concerns, it is preferable to limit the duration of the conversion gate 436 to a maximum of about six times the duration of the echo signal 434. Alternatively, the conversion gate 436 could be made to open a predetermined period of time before the expected arrival of the echo signal of interest and close a predetermined period of time after the echo signal. This predetermined period of time could correspond to a distance of up to about three inches.

Referring back to FIG. 8, at step 420, the accumulated values stored in the accumulators 407, 409, 411 are divided by the number of bursts transmitted for which data was collected. This number is referred to herein as the "averaging index." The resultant average gain and magnitude values are stored in a classification buffer, which is shown in FIG. 9c and designated with the numeral 415. The average travel time is also determined, and the corresponding average distance to the target is determined therefrom. This average distance is the compensated distance which takes temperature or other atmospheric conditions into account. The contents of the classification buffer 415 generally correspond to the tank 12 of FIG. 1 and the echo signals of FIG. 1a. The classification buffer 415 has data for only four targets since the echo signal 30e of FIG. 1a is spurious.

At step 424, after the average target data has been generated and stored in the classification buffer 415, the targets are classified using the average data to determine which of the targets, if there is more than one target, is the true target. The classification is accomplished with a two-step process. First, at the option of the operator, either the closest target to the transducer or the target that generated the echo having the largest magnitude is initially selected as the true target. The target distance for this initial selection is then compared to the target distances stored in a "bogus buffer," which is shown in FIG. 9d and designated with the numeral 425, to determine whether the initial target selected is a bogus target. If not, that target is classified as the true target. If the initial target is a bogus target, a new initial selection is made. The process is repeated, as described in detail below, until the true target is found.

At step 426, after the true target has been identified, the position of the conversion gate used by the sonar routine is determined based upon the true target distance. As a result, the sonar routine "tracks" the true target as identified by the range search routine.

Figure 10A:
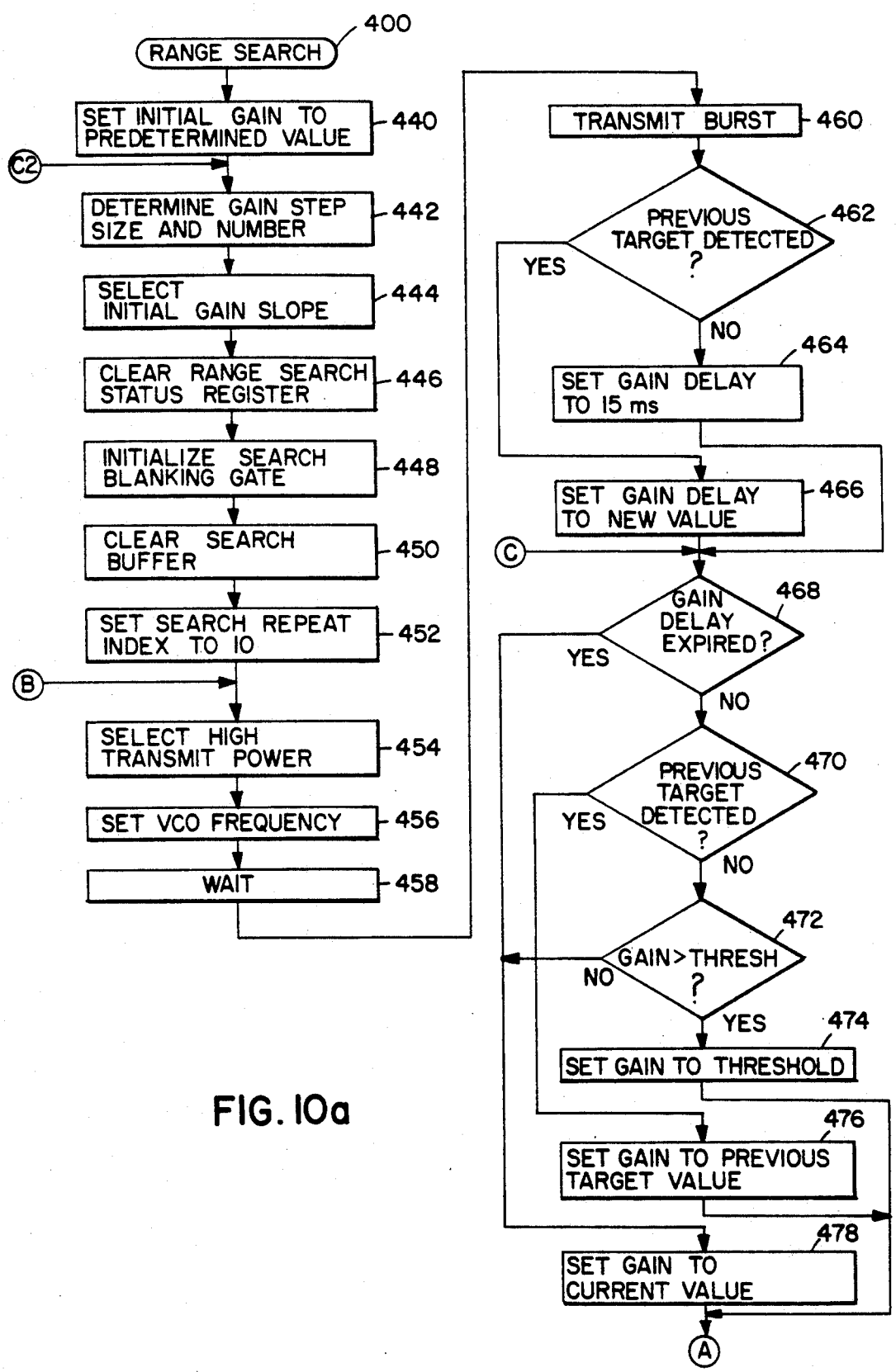
FIGS. 10a–10f are a flowchart of a range search routine schematically shown in the main operating routine of FIGS. 3a and 3b.

A detailed flowchart of the range search routine 400 is shown in FIGS. 10a-10f. Referring to FIG. 10a, the routine begins execution at step 440 where the initial gain for the gain slope lines is set to a predetermined value. This initial gain value would correspond to the gain at which the gain slope lines 370a and 180a begin.

At step 442, the number and size of the gain steps is determined. These gain steps are the amounts by which the initial gain value will increase from one gain slope line to another. The size of the gain steps can be any desired magnitude. After the gain step magnitude is chosen, the number of gain steps is determined by subtracting the minimum gain from the maximum gain (see FIG. 7a) and dividing that result by the magnitude of the gain steps.

At step 444, the initial gain slope is selected. Where stepped gain lines are used, the initial gain slope may be chosen to correspond to a discrete value by which the gain is periodically reduced. This discrete value may be reduced later to increase the slope of subsequent gain lines.

Figure 11:
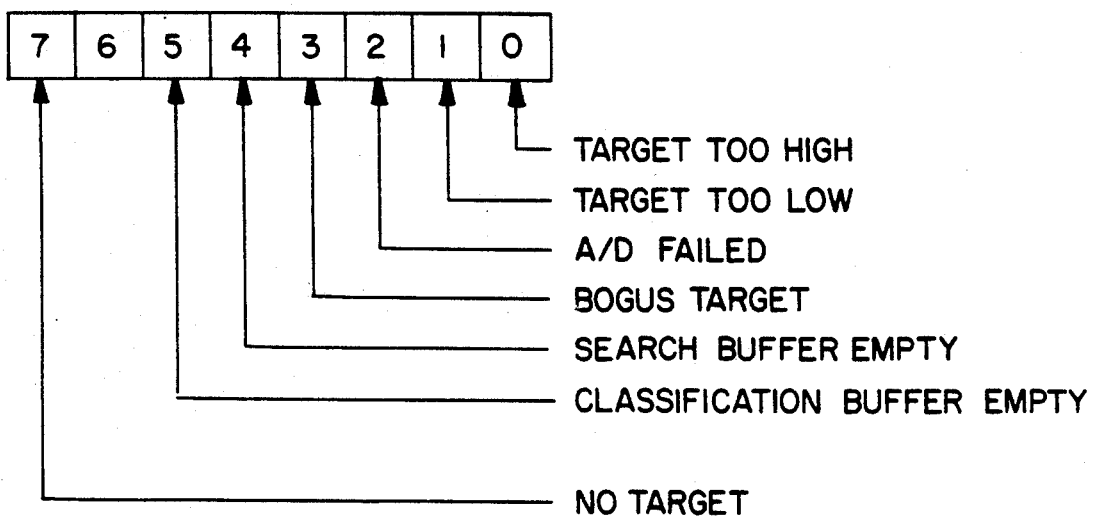
FIG. 11 illustrates a range search status register used by the range search routine of FIGS. 10a–10f.

At step 446, the range search status register is cleared. This register, which is shown in FIG. 11, is an eight-bit register in which bit 7 is used as a "no target" flag to indicate that no true target was detected during the range search routine. The "no target" flag may be set as a result of any one of six reasons, which are indicated by bits 0-5 of the status register. Bit 0 of the register is used as a "target too high" flag that indicates that the magnitude of the echo signal associated with the target was too large. Bit 1 is used as a "target too low" flag that is set when the magnitude of the target echo was too small. Bit 2 is used as an "A/D failed" flag to indicate failure of the A/D converter 114. Bit 3 is used as a "bogus target" flag to indicate that the target was a bogus target. Bit 4 is used as a "search buffer empty" flag that is set when the data buffer for storing target data generated during the search mode of the range search routine is empty. Bit 5 is used as a "classification buffer empty" flag that is set when the data buffer for storing target data generated during the classification mode of the range search routine is empty.

Referring back to FIG. 10a, at step 448, a search blanking gate is initialized to a predetermined value. This search blanking gate is used to prevent the detector 10 from responding to echoes that are received during the search blanking gate. At step 450, the contents of the search buffer are cleared. At step 452, the search repeat index is set to 10. This index causes the search mode portion of the range search routine to be executed 10 times if no targets are detected within the range of interest.

Step 454 is the first step in a loop that is performed each time an energy burst is transmitted and its associated gain line generated. At step 454, the high power setting of the pulse generator 42 is selected by the controller 40 via the line 44. At step 456, the frequency vector generated during the last execution of the frequency match routine 300 is sent to the D/A converter 60 to set the VCO frequency to the proper value.

At step 458, the program waits a predetermined period of time for any old echoes to die out. Such old echoes would be generated due to multiple internal reflections of energy bursts previously transmitted. At step 460, an energy burst is transmitted by the transducer 16. This is accomplished by sending the transmit gate (see FIGS. 6 and 12b) to the VCO 50 to cause the pulse generator 42 to excite the transducer 16.

At step 462, the program determines whether a target has been previously detected during the current execution of the search mode portion of the range search routine. The purpose of determining whether a target has been previously detected is to set a gain delay that is used to control the gain of the current gain line. As described above in connection with FIGS. 7a-7c the shape of the gain lines changes after the detection of a target. If no target has been detected, the program branches to step 464 where the gain delay is set to 15 milliseconds (ms). This time period corresponds to the immediate field and is shown in FIG. 7a as arrow 372.

If a target has been previously detected, the gain delay is set to a new value, which is equal to a period of time slightly longer, such as 400 microseconds longer, than the time at which the most recent echo was detected. The gain delay in this case would thus correspond to the line 376 in FIG. 7b after the detection of target A and the line 378 in FIG. 7c after the detection of target B. As explained above in connection with FIGS. 7b and 7c the gain cannot exceed the gain value at which the most recent target was detected until the gain delay expires.

After the gain delay is set, the program branches to step 468. Steps 468-478 control the value of the gain after transmission of the energy burst to effectively generate one of the gain lines. At step 468, if the gain delay has expired, the gain may increase to its maximum value, and the program branches to step 478 where the gain is set to the current gain value. As explained above, the current gain value is determined based on the initial gain value and the slope of the gain line. A read-only memory (ROM) lookup table may be used to store appropriate gain values from which the current gain value could be periodically retrieved. Such ROM lookup tables are conventional.

If the gain delay has not yet expired as determined at step 468, then the maximum value of the gain is limited by either the threshold gain (see FIG. 7a) or the gain at which the most recent target was detected. Accordingly, if the gain delay has not expired, the program branches to step 470 to determine whether a target was previously detected. If there was a target previously detected, the program branches to step 476 where the gain is set to the value at which the previous target was detected. If no previous target was detected at step 470, the program branches to step 472 where the gain is compared with the threshold gain value. If the gain is greater than the threshold gain value, the program branches to step 474 where the gain is set to the threshold value.

Figure 10B:
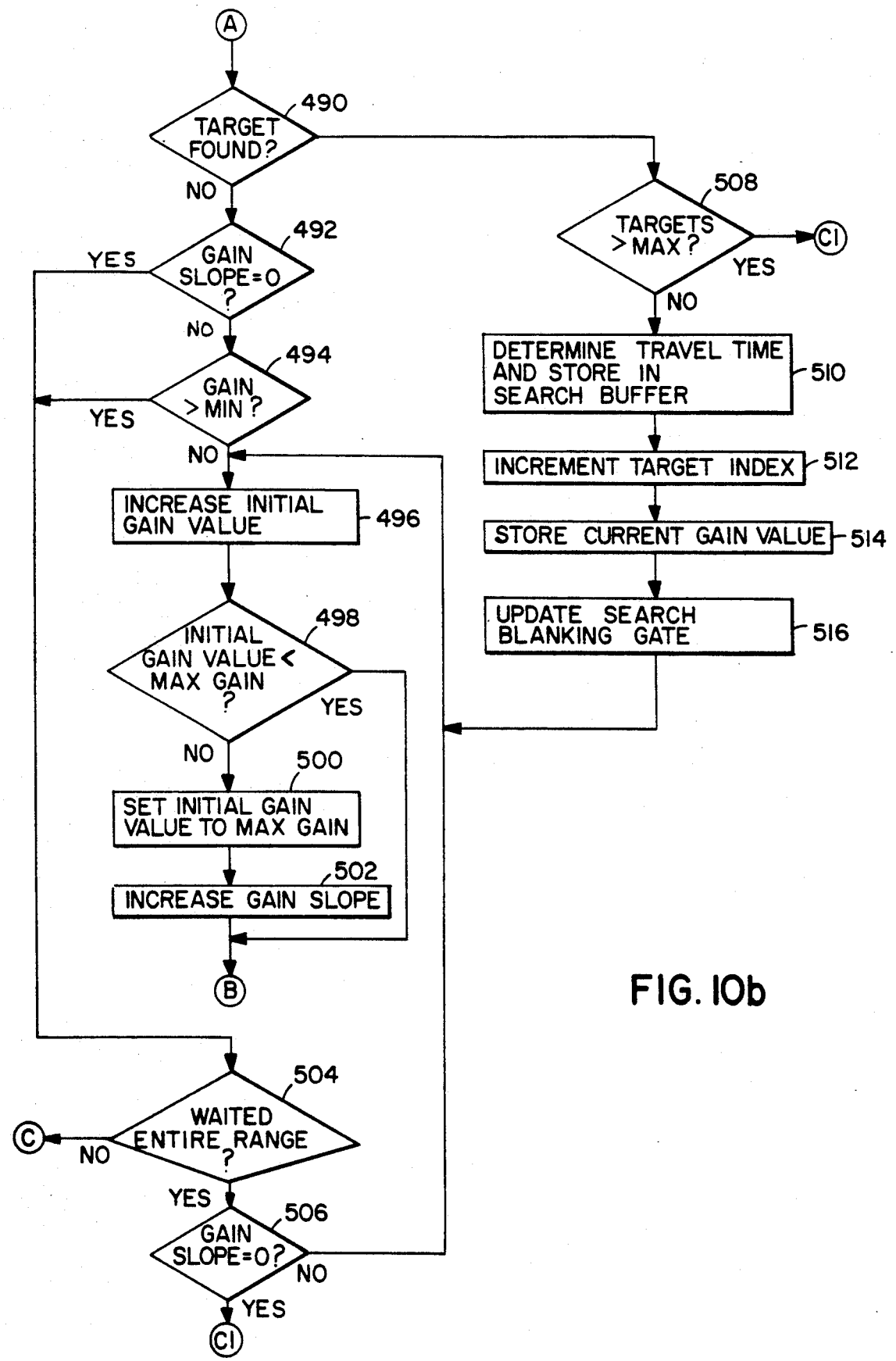

Referring to FIG. 10b, the program then proceeds to step 490, where the program determines whether a target associated with the current gain line has been found. If no target has been found, the program branches to step 492 where the gain slope is checked to determine whether it is zero. If the gain slope is zero, meaning that the last gain line is being generated, the program branches to step 504 to determine if the program has waited for an echo from any target within the entire range of interest. As indicated above, this range may be set by the user and corresponds to the vertical dotted line 374 in FIG. 7a.

Figure 10C:
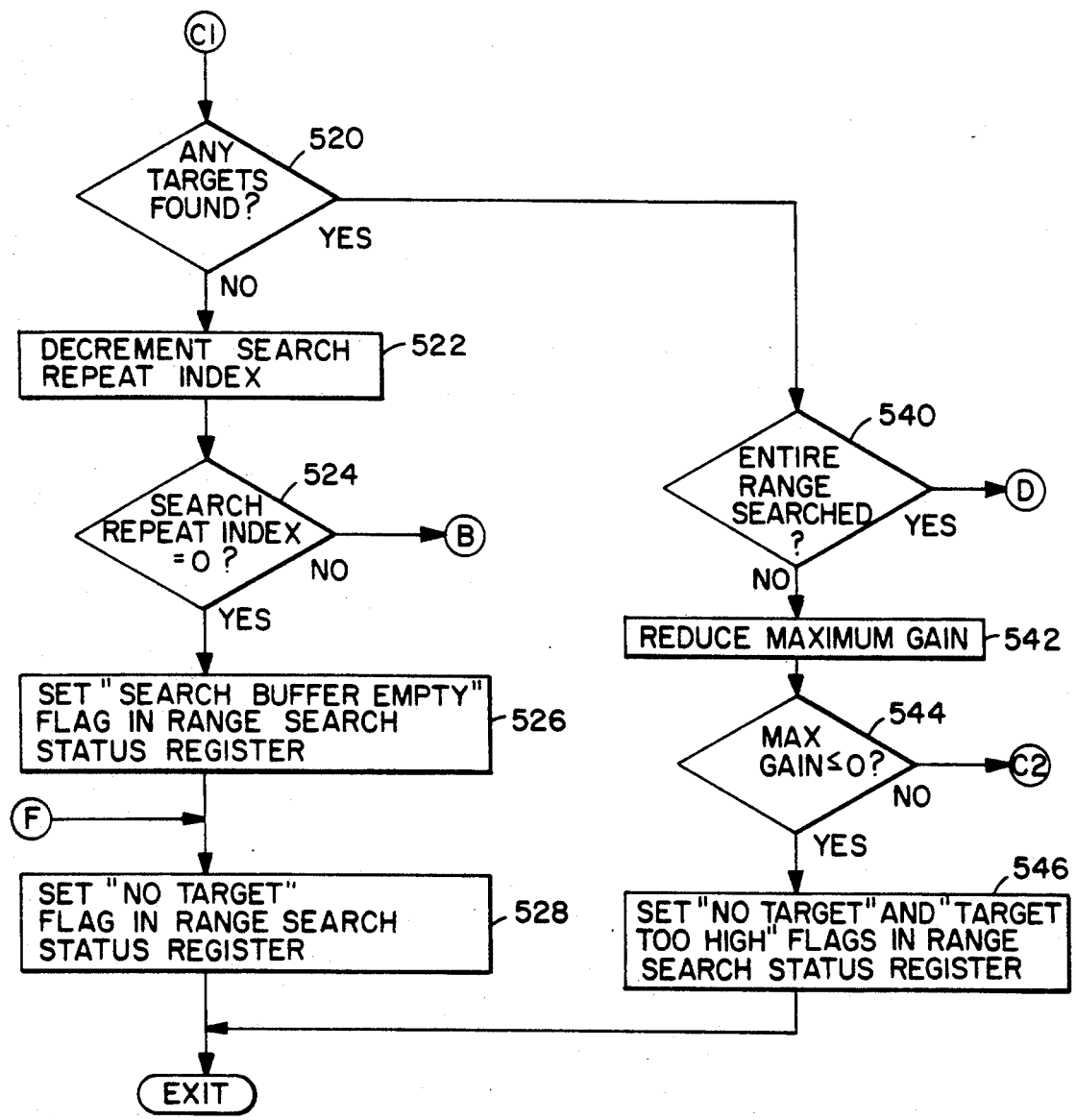

If the program has waited for a time corresponding to the entire range of interest, and the gain slope is zero as determined at step 506, then no more bursts are transmitted by the transducer 16 during the search portion of the range search routine, and the program branches to step 520 shown in FIG. 10c. If the program has not waited for a time corresponding to the entire range of interest as determined at step 504, the program branches back to step 468 of FIG. 10a.

If at step 492 the gain slope was not zero, the program branches to step 494, which determines whether the gain is greater than a minimum value (see FIGS. 7a–7d). If the gain is not greater than the minimum value, then the search corresponding to that gain line is over. In this case, the program branches to step 496 where the initial gain value is increased by the gain step size determined in step 442, and then the program branches to step 498 where the new initial gain value is compared with the maximum gain value (see FIGS. 7a–7d).

If the new initial gain value is greater than the maximum gain value, the program branches to step 500 where the new initial gain value is set to the maximum gain value. At step 502, the gain slope is increased. The program then proceeds back to step 454, after which another burst will be transmitted and a new gain slope line will be generated. If the new initial gain value is not greater than the maximum gain value as determined at step 498, then steps 500 and 502 are skipped.

If the gain was greater than the minimum value as determined at step 494, then the program branches to step 504. If the program has waited the entire range of interest as determined at step 504 and if the gain is not zero as determined at step 506, the program branches to step 496 where the parameters for the next gain line are determined. This path through steps 494, 504, 506, and 496 would occur, for example, when the gain line 370h reached the point G in FIG. 7a.

Upon the detection of a target as determined at step 490, the program branches to step 508 where the number of targets found during the search thus far is compared to a maximum target number. The purpose of the comparison is to lower the maximum gain level if too many targets are detected. For example, if the maximum gain level is set too high, ten echoes corresponding to noise might be detected, one on each of the first ten gain lines. In this case, assuming the maximum number of allowable targets was eight, the large number of detected targets would trigger a reduction in the maximum gain to reduce or eliminate the detection of echoes due to noise.

If the number of targets found thus far does not exceed the maximum number, the program branches to step 510. At step 510, the time between the transmission of the burst and the receipt of the echo associated with the target, or target travel time, is stored in the search buffer. As described above, this travel time corresponds to the time $T_1$ of FIG. 12b. At step 512, the target index, which corresponds to how many targets have been detected, is incremented.

At step 514, the gain value at which the target was detected is stored. As described above, this gain value is used as an upper limit for the gain lines generated after the detection of the target. At step 516, the search blanking gate is updated. The new value of the blanking gate is set to correspond to a short time following the detection of the target, the short time being about 400 microseconds. Thus, referring to FIG. 7b, after the detection of target A, the blanking gate would open to allow the detection of echoes at the time coinciding with the solid vertical line 518. After step 516, the program branches to step 496 to generate the next gain line.

If the number of targets detected is greater than the maximum number as determined at step 508, the program branches to step 520 shown in FIG. 10c. At step 520, the program determines whether any targets have been found. If no targets have been found, the program branches to step 522 where the search repeat index is decremented to indicate that a search of the entire range has just been completed. The program then proceeds to step 524 which determines whether the search repeat index is zero.

If the search repeat index is not zero, then the program branches back to step 454 of FIG. 10a where another search of the entire range is initiated. If the search repeat index is zero, meaning that 20 searches of the entire range have not generated any targets, then the program branches to steps 526 and 528 where the "search buffer empty" and "no target" flags in the range search status register are set, and then the range search routine 400 terminates.

At step 520, if any targets were found during the search, the program branches to step 540 which determines whether the entire range has been searched. The entire range is considered searched when the gain slope is zero and the routine has waited for an echo for the entire range of interest.

If the entire range has not been searched, which will be the case when the number of targets exceeded the maximum allowable as determined at step 508, the program branches to step 542 where the maximum gain (see FIGS. 7a–7d) is reduced. At step 544, the reduced value of maximum gain is then compared with zero. Assuming the gain is greater than zero, the program branches back to step 442 after which the entire range of interest will be searched with the gain lines not exceeding the new maximum gain value.

If the maximum gain value is less than zero, then the gain cannot be reduced any further. In this case, the program branches to step 546 where the "no target" and "target too high" flags are set in the range search status register. The range search routine 400 then terminates.

Figure 10D:
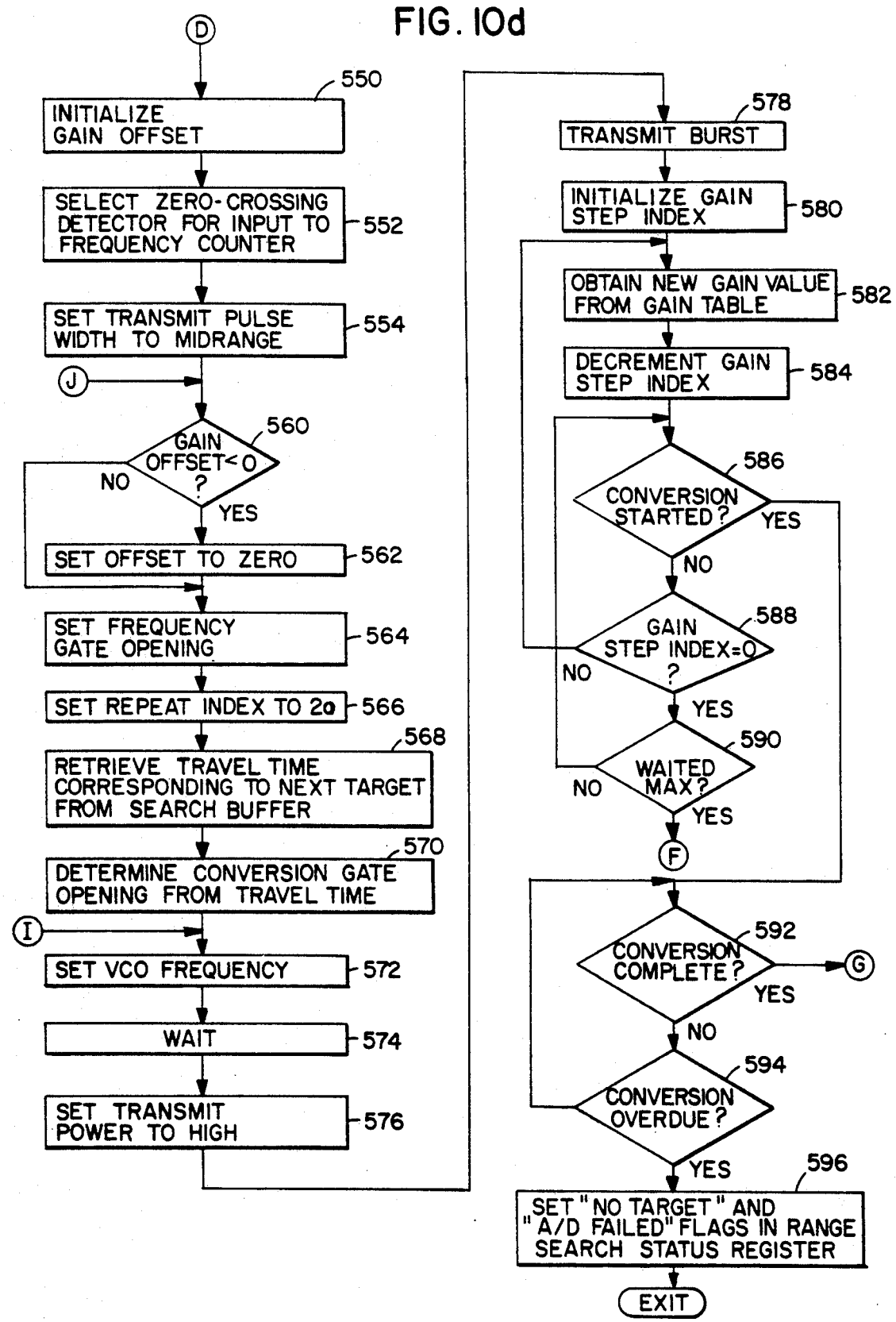
Figure 10E:
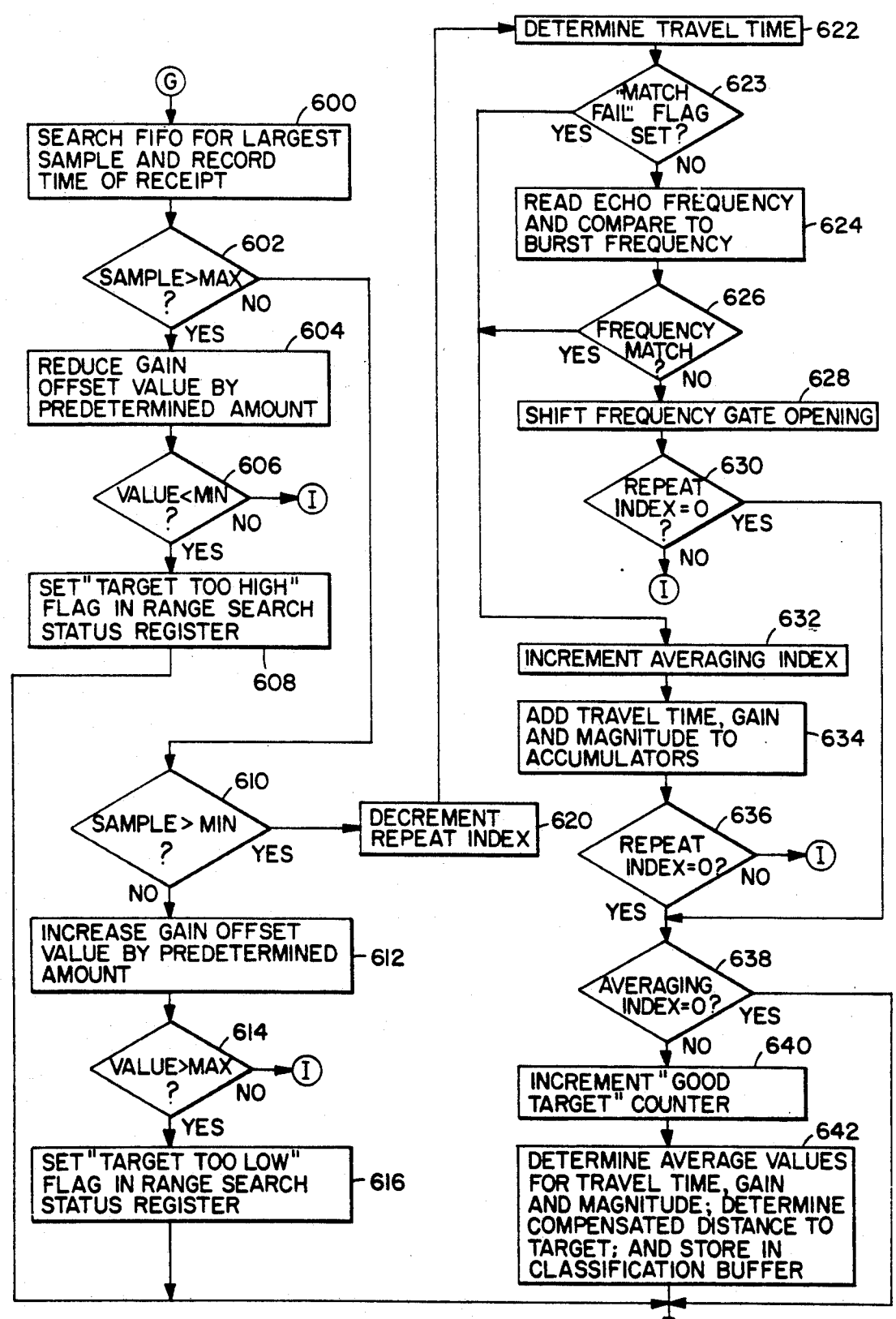
Figure 10F:
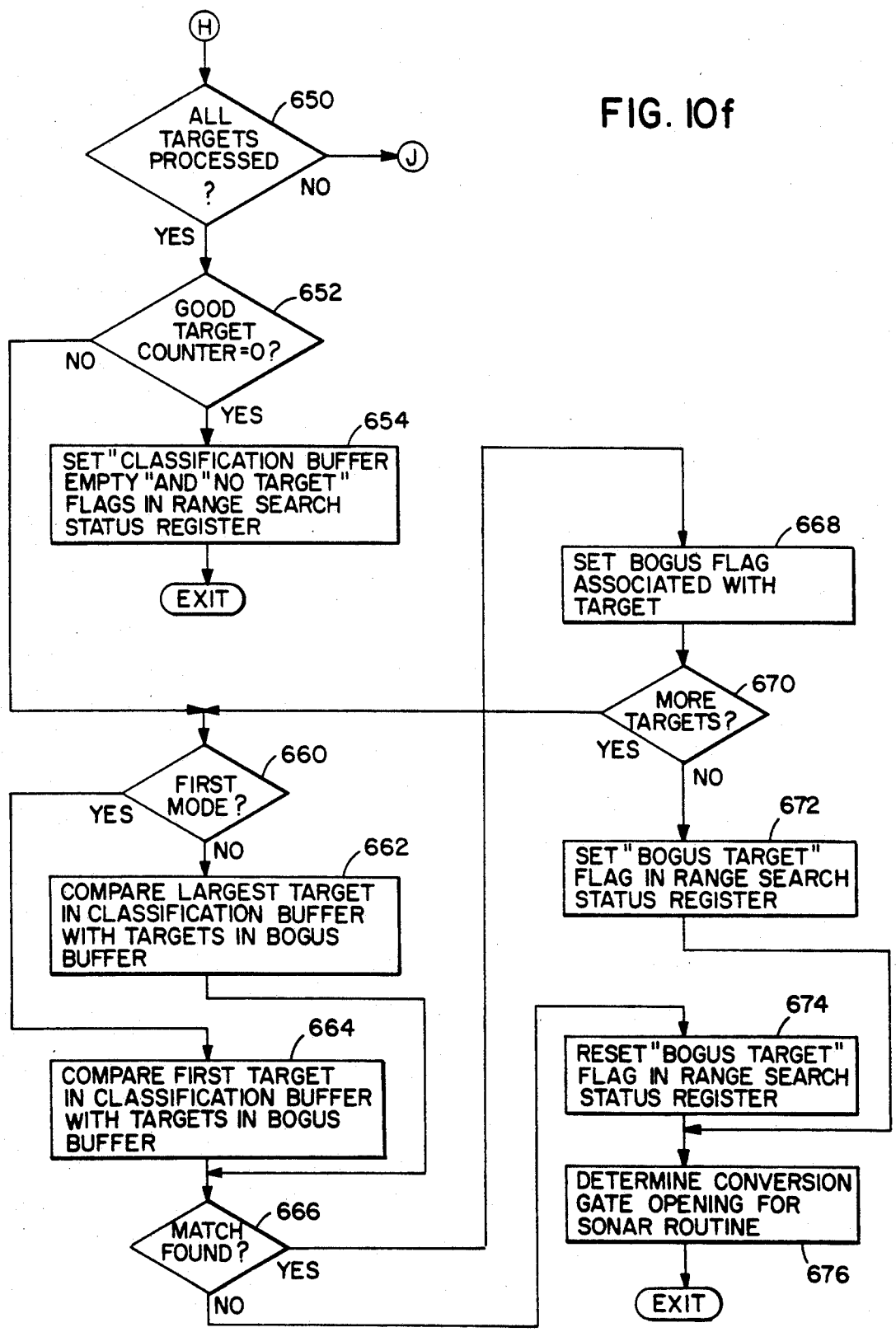

If the entire range was searched as determined at step 540, the program branches to the classification mode of the range search routine, which is shown in FIGS. 10d–10f. During this mode, average target data is collected from 20 echoes associated with each target, and then upon the average target data, the true target is identified. The classification mode also determines the initial setting of the conversion gate for the sonar routine.

During the classification mode, the gain is controlled in a significantly different manner than the way it is controlled in the search mode. In the classification mode, the gain of the amplifier 90 is gradually increased exponentially with time. This gradual increase is to account for the fact that the ultrasonic echoes are attenuated as they travel through the atmosphere in the tank 12. Referring to FIG. 12a, the gain during the classification mode is shown to gradually increase from a gain offset value. The gain offset value may be changed to shift the entire gain curve either up or down as indicated by the dotted lines above and below the solid gain curve.

Referring to FIG. 10d, the classification mode of the range search routine begins at step 550, where the gain offset value is initialized. At step 552, the output of the zero-crossing detector 130 is selected for input to the frequency counter 150 via the multiplexer select line 144. At step 554, the transmit pulse width generated by the VCO 50 is set to its midrange value. At step 560, the gain offset is tested to determine whether it is zero. The gain offset is tested at this point since it might have been reduced to a value less than zero at another point in the classification mode. If the gain offset is less than zero, then it is set to zero at step 562.

At step 564, time at which the frequency gate opens is set to an initial value. The frequency gate in this case, which is used to measure the frequency of the received echo signals, is shown in FIG. 12b.

Referring to FIG. 12b, the echo signal 434 generated in response to receiving an echo from a target is shown. If the echo was not a spurious echo, due to noise for example, the frequency of the echo signal 434 would be substantially the same as the frequency at which the original energy burst 432 was transmitted. A frequency gate 569 and a shifted frequency gate 571 are shown in time relationship with respect to the echo signal 434. The shifted frequency gate 571 is generated in certain circumstances to determine the frequency of another portion of the echo signal 434.

Referring back to FIG. 10d, after the initial position of the frequency gate is set at step 564, the program branches to step 566 where the repeat index is set to 20. The repeat index determines how many bursts of energy are transmitted for each target in the search buffer. At step 568, the travel time corresponding to the next target is retrieved from the search buffer. At step 570, the opening of the conversion gate 436 is determined based on the travel time retrieved during step 568. This determination is made by subtracting a very short period of time from the travel time so that the conversion gate 436 opens a short period of time before the echo signal 434 arrives as shown in FIG. 12b.

At step 572, the frequency of the VCO 50 is set in accordance with the current frequency vector. At step 574, the program waits for a predetermined period of time for old echoes to die out. This waiting period may be dynamically varied if desired. At step 576, the pulse generator transmit power is set to its high setting, and at step 578 a burst is transmitted.

Steps 582-588 relate to the control of the exponentially increasing gain during the classification mode. This gain, which was described above in connection with FIG. 12a, is generated by discrete gain values stored in a gain table in a ROM (not shown). The gain table has a predetermined number of discrete gain values, and the gain gradually increases exponentially in a like number of discrete steps. At step 580, the gain step index is initialized to correspond to the number of discrete gain values in the gain table. At step 582, a new gain value is obtained from the gain table, and at step 584 the gain step index is incremented.

At step 586, if the conversion gate has not yet opened, the program branches to step 588, which checks to see if the gain step index is zero. If the gain step index is not zero, meaning that there are additional gain values available, the program branches back to step 582 where a new gain value is obtained from the gain table. If the gain step index is zero, the program branches to step 590, which determines whether the entire range of interest has been searched. If not, the program branches back to step 586. If so, the program branches to step 528 of FIG. 10c where an error flag is set after which the range search routine 400 terminates since no echo detected.

When the conversion gate opens as determined at step 586, the program branches to step 592 which determines if the A/D conversion has been completed. When the conversion is in progress, the system gain is held constant. If the conversion has not been completed within the normal period of time as determined at step 594, then the program branches to step 596 where the "no target" and "A/D failed" flags are set in the range search status register. The range search routine 400 then exits.

When the conversion is complete as determined at step 592, the program branches to step 600 shown in FIG. 10e. At step 600, the FIFO 124 is searched for the largest sample, which corresponds to the peak portion of the echo signal received, and the time of receipt of that sample is recorded. Steps 602-616 ensure that the magnitude of the largest sample is within a predetermined range. This range is utilized because if the sample magnitude is too high, then the amplifier 90 might be saturating, which would prevent the range search routine from determining the precise peak of the echo signal. On the other hand, if the sample magnitude is too low, then the zero-crossing detector 130 might not generate a zero crossing each time the falling portion of the echo signal passes through zero, thus jeopardizing the accuracy of the frequency check of the echo signal.

At step 602, the magnitude of the sample is compared with a predetermined maximum magnitude. If the sample magnitude is too large, the program branches to step 604 where the gain offset value (see FIG. 12a) is reduced by a predetermined amount. The new value of the gain offset value is compared with a minimum value at step 606. If the new value is not less than the minimum, the program branches back to step 572 of FIG. 10d after which another burst will be transmitted with a lower exponential gain curve. If the new gain value is less than the minimum value, then the program branches to step 608 where the "target too high" flag is set in the range search status register.

If the magnitude of the sample was not greater than the maximum value as determined at step 602, the program branches to step 610 where the sample magnitude is compared to a minimum value. If the sample magnitude is not greater than the minimum, the program branches to step 612 where the gain offset value is increased to shift the exponential gain curve upward. At step 614, the new value of the gain is compared with a maximum value. If the new value is not greater than the maximum value, the program branches back to step 572. Otherwise, the program branches to step 616 where the "target too low" flag is set in the range search status register.

If the magnitude of the sample is within the desired range, then the program will branch to step 620 from step 610. At step 620, the repeat index is decremented, and at step 622 the travel time associated with the peak portion of the echo signal is determined. The travel time is determined based upon the difference between the time of receipt of the peak echo signal recorded during step 600 and the time corresponding to the falling edge of the transmit gate and is shown in FIG. 12b as time $T_2$.

At step 623, the "match fail" flag is checked. If the "match fail" flag is set, indicating the failure of the most recent execution of the frequency match routine, the program skips step 624.

At step 624, the frequency of the echo signal is determined and compared with the frequency at which the burst was transmitted, which is substantially equal to the average ringdown frequency of the transducer 16. If the two frequencies match, then the program branches to step 632, where the averaging index is incremented. The averaging index is used to indicate the number of detected echoes that passed the magnitude and frequency tests of steps 602, 610, and 624. The target data for these "good" echoes is averaged at a later point in the range search routine 400.

At step 634, the travel time, the magnitude of the echo signal, and the gain at which the echo signal was detected are added to the accumulators 407, 409, 411. At step 636, the repeat index is tested to determine whether it is zero. If it is, meaning that all the necessary attempts have been made to collect good echo data for that target, then the program branches to step 638.

If the frequencies do not substantially match as determined at step 626, the program branches to step 628 where the opening of the frequency gate is shifted (see shifted frequency gate 571 of FIG. 12b). If the repeat index is not equal to zero as determined at step 636, the program branches to step 572 to transmit another burst whose frequency is measured with the new frequency gate.

If the repeat index is zero, then no more energy bursts are transmitted, and the program branches to step 638. At step 638, the averaging index is tested to determine whether it is zero. The averaging index represents the number of "good" echoes for which target data has been stored in the accumulators 407, 409, 411. If the averaging index is not zero, then the program branches to step 640 where the good target counter is incremented.

At step 642, the average values of the travel time, gain, and magnitude for the current target are computed by dividing the contents of the accumulators 407, 409, 411 by the averaging index. The compensated distance to the target is then determined from the average travel time and either the current temperature reading or the current reference reflector travel time. The average compensated distance, the average magnitude, and the average gain are stored in the classification buffer 415.

If the averaging index was zero as determined at step 638, then not a single echo was received that passed the magnitude and frequency tests. As a result, no target data was generated for the current target. This would be the case, for example, for the spurious echo 30e of FIG. 1a since that echo would likely not pass the frequency test of step 626.

Referring to FIG. 10f, the program then branches to step 650, which determines whether all the targets in the search buffer 405 have been processed. If there are any remaining targets, the program branches back to step 560 (FIG. 10d) which will result in the next target in the search buffer 405 being processed.

If all the targets have been processed, the program branches to step 652 which determines whether the good target counter is zero. If the good target counter is zero, then there are no targets for which data was stored in the classification buffer 415. In this case, the program branches to step 654 where the "classification buffer empty" and "no target" flags in the range search register are set. The range search routine 400 then terminates at this point.

If the good target counter was not equal to zero at step 652, then the program branches to step 660. Steps 660-676 constitute the final portion of the range search routine 400 which identifies the one true target detected during the routine by comparing the target data stored in the classification buffer 415 with the target data stored in the bogus buffer 425.

Steps 660-664 allow the user of the detector 10 to specify whether the detector operates in one of two modes, a "first" mode in which the detector identifies the first non-bogus echo received by the transducer 16 as the true echo, and a "largest" mode in which the detector identifies the largest non-bogus echo as the true echo. In the "first" mode, the detector would identify the echo 30c of FIG. 1a as the true echo, whereas in the "largest" mode, the detector would recognize the echo 30d as the true echo. Echoes 30a and 30b would not be identified since they are bogus echoes, and echo 30c would not be identified since it is a spurious echo.

The user of the detector 10, based upon the echo characteristics of the tank in which the detector was being used, would select the mode that would provide the proper identification of the true target.

At step 660, if the detector 10 is in the "first" mode, the program branches to step 664 where the target having the smallest distance in the classification buffer 415 (see FIG. 9c) is compared with the targets in the bogus buffer 425 (see FIG. 9d). This target would be target #1 since that target has the smallest distance. If the distance to target #1 stored in the classification buffer 415 matches any of the distances in the bogus buffer 425 as determined at step 666, then the program branches to step 668 where a bogus flag associated with the target #1 in the classification buffer 415 is set to one, indicating that that target is a bogus target.

If the detector 10 is in the "largest" mode as determined at step 660, the program branches to step 662 where the target in the classification buffer 415 with the largest magnitude is compared with the targets in the bogus buffer 425. The determination of which target has the largest magnitude may take into account the average gain at which that target was detected. Referring to FIG. 9c, the largest target would be target #1, since that target has the largest magnitude and the smallest gain. The gain values shown in FIG. 9c are somewhat arbitrarily based on a 10-point gain scale, with larger numbers corresponding gain values.

The average distance at which the largest target was detected is then compared the distances of the bogus targets in the bogus buffer 425. If there is a match as determined at step 666, then the program branches to step 668 where the bogus flag associated with that largest target is set.

It should be appreciated that the specific magnitudes of the echoes shown in the classification buffer 415 will not necessarily correspond to the size of the echoes shown in FIG. 1a since exponentially increasing gain is used during the classification portion of the range search routine. The specific numbers shown in the classification buffer 415 were chosen somewhat arbitrarily only to facilitate explanation of the preferred embodiment.

If there is no match found during step 666, indicating that the target identified was not a bogus target, then the program branches to step 674 where the "bogus target" flag in the range search register is reset. The program then proceeds to step 676 where the distance from the detector at which the true target was detected is used to determine the time at which the conversion gate opens during the sonar routine. The range search routine 400 then ends.

At step 670, which is only performed where the identified target was a bogus target, the program determines whether there are additional targets in the classification buffer 415. If there are, then the program branches back to steps 660-664, where either the target having the second largest magnitude will be selected in the "largest" mode or the target which had the second smallest distance will be selected in the "first" mode.

Ultimately, the repeated performance of steps 660-670 will result in echo 30c (see FIG. 1a) being identified as the true target if the detector is in the "first" mode, and echo 30d will be identified as the true target if the detector is in the "largest" mode. Obviously, the proper mode of the detector 10 for the tank of FIG. 1 would be the "first" mode since the echo 30c is the echo generated by the liquid surface.

If there are no targets in the classification buffer 415 that are not bogus targets, the program will branch to step 672 where the "bogus target" flag will be set in the range search register indicating that all the targets were bogus targets. The program then branches to step 676 where, the conversion gate is generated for the sonar routine based upon either the first or largest target identified during the first execution of steps 662, 664, even though it is a bogus target.

In summary, the range search routine is performed once each 200 cycles of the main operating routine. When executed the range search routine searches the entire range of the detector, identifies the true target, and generates the conversion gate for the sonar routine based upon that true target. Thus, the range search routine dictates which target the sonar routine tracks.

The contents of the bogus buffer 425 may be determined automatically with the use of the range search routine in several different ways as follows. The range search routine would be performed with no liquid in the tank 12 or with the liquid at a known level and with the bogus buffer empty, and the detector would be operated in the "first" mode of operation as described above.

The first manner of automatically determining the bogus target distances applies to a detector that has a visual display, such as an LED display, of the true target distance. In this case, the execution of the range search routine would cause the distance corresponding to the closest target to be displayed on the visual display, since the detector is in the "first" mode of operation. The operator would then examine the visual display to determine whether the distance corresponded to the known level of the liquid. If there was no such correspondence, the operator would enter the distance to the target into the bogus buffer, and then allow the range search to be repeated.

Each execution of the range search would cause the distance to the next target to be displayed, and the operator could determine whether the displayed distance corresponded to the known liquid level, if present, all other distances being assumed to correspond to bogus targets. This process would be repeated until the distance provided on the visual display was greater than the distance to the bottom of the tank, or to the known liquid level if there is liquid in the tank.

The above method would find the distances to all bogus targets between the transducer and the known liquid level, if there is liquid within the tank, or between the transducer and the bottom of the tank, if no liquid is present.

The second manner of automatically determining the bogus target distances could be used where the visual display of the detector includes the distances of all targets identified in the classification buffer, instead of only the single true target. In this case, the range search routine could be used in either the "first" or "largest" modes of operation. After the first execution of the range search routine, the distances corresponding to all targets in the classification buffer would be visually displayed. The operator would then enter all such displayed distances into the bogus buffer, except that distance that corresponded to the known liquid surface, if there is liquid in the tank.

The above two methods are advantageous in that the distances are determined automatically by the detector, without the need for manual measurement of the distances to the bogus targets which might be subject to inaccuracies.

In a slight modification of the above two methods, the detector could store each of the bogus distances without requiring the operator to input those distances. In this case, the detector would prompt the operator with a "yes or no" prompt that would determine whether the currently displayed distance or distances should be entered into the bogus buffer. As a result of using the "yes-no" prompt, there is no possibility of an operator inputting the distances incorrectly. This modification is advantageous in that it would eliminate errors resulting from manual entry of the distances.

Sonar Routine

The sonar routine is executed during each loop of the main operating routine. Thus, it is executed much more frequently than the match and range search routines described above.

During operation, the sonar routine generates average target data for the true target that was identified during the range search routine. This average target data is generated by transmitting an initial energy burst, and setting the conversion gate for this initial energy burst to the position specified by the range search routine. Subsequent energy bursts are transmitted, with the position of the conversion gate being adjusted by the sonar routine after the transmission of each burst. The travel time associated with the echo of the energy bursts are averaged, and the average distance to the true target is determined based upon the average travel time.

Figure 14:
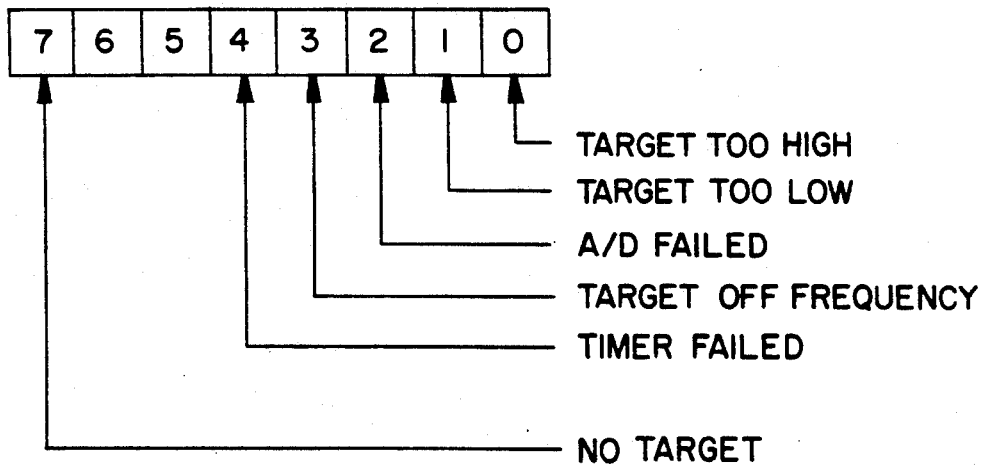
FIG. 14 illustrates a sonar status register used by the sonar routine of FIGS. 13a–13c.
Figure 13A:
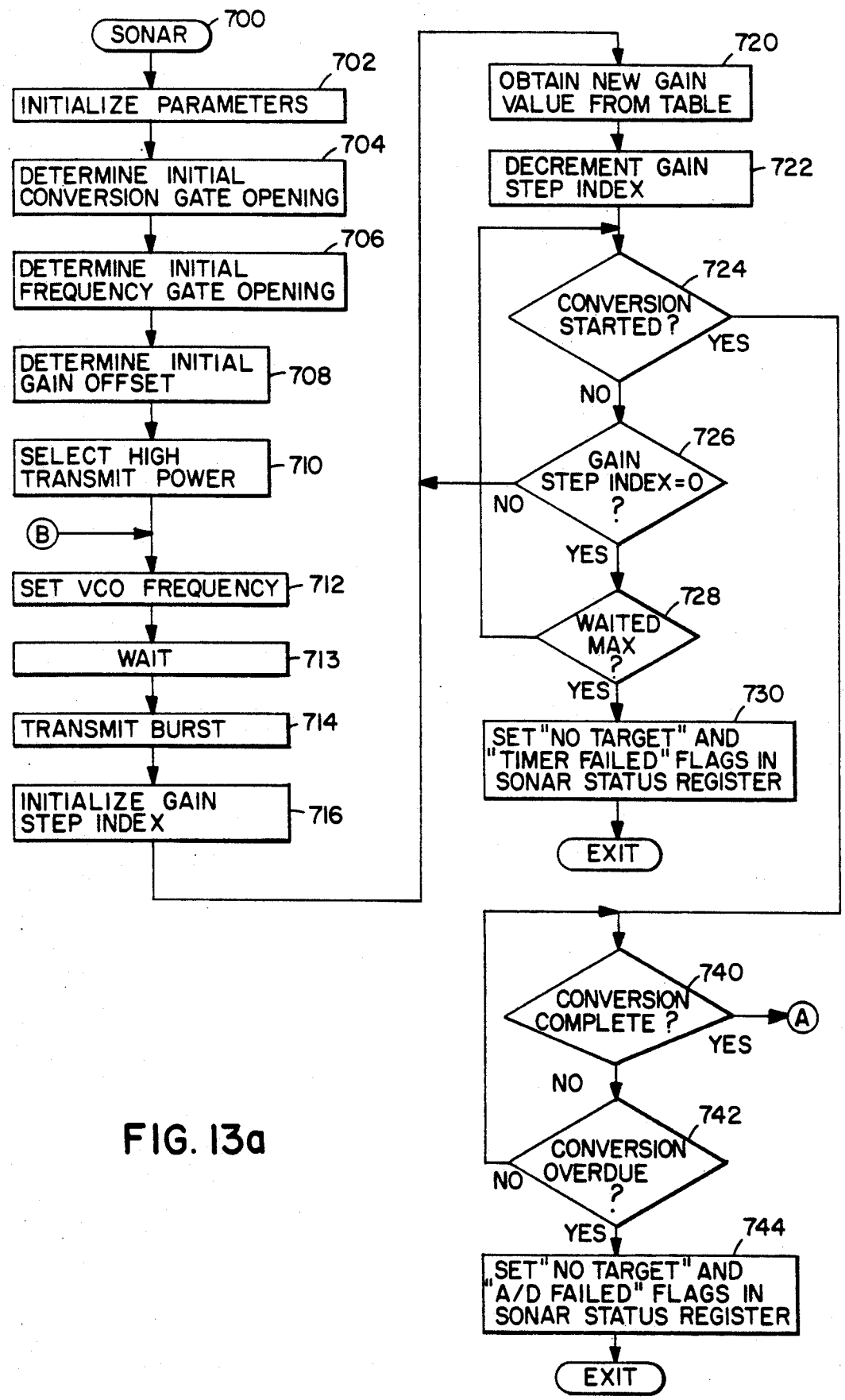
FIGS. 13a–13c are a flowchart of the sonar routine schematically in the main operating routine of FIGS. 3a and 3b.
Figure 13B:
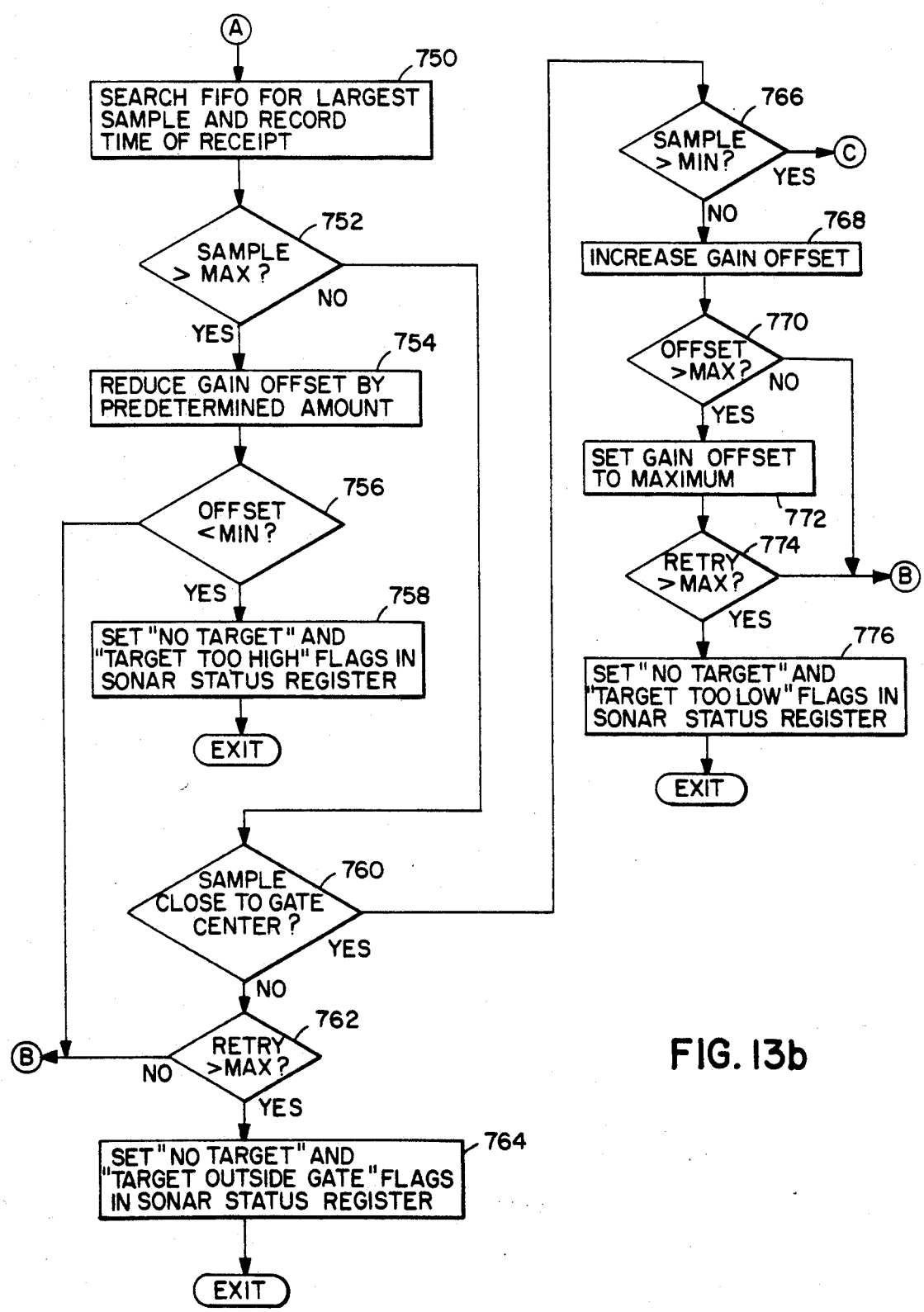
Figure 13C:
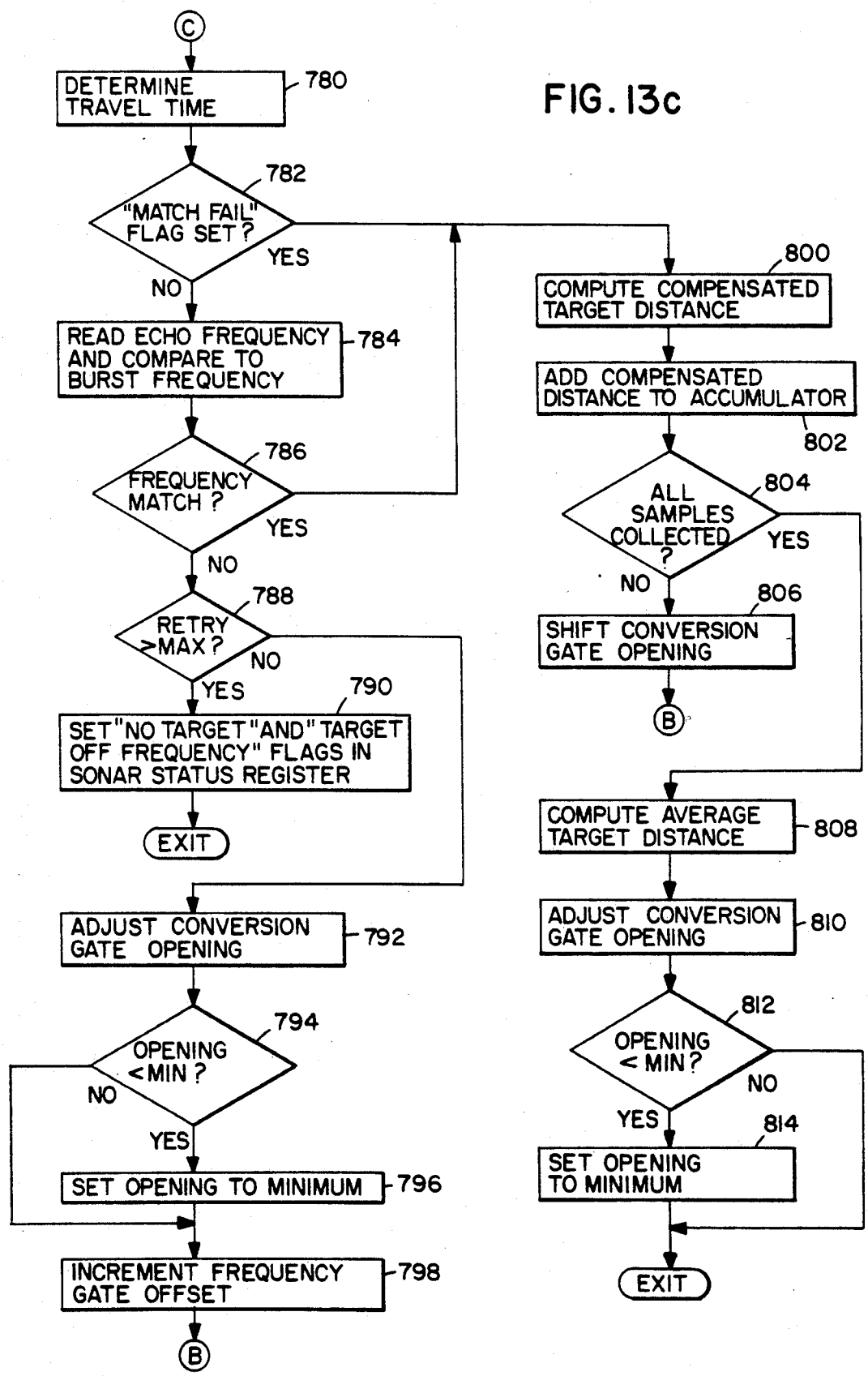

A flowchart of the sonar routine is shown in FIGS. 13a-13c. Referring to FIG. 13a, the sonar routine 700 begins operation at step 702 where a number of parameters are initialized. These parameters include the contents of a sonar status register, which is shown in FIG. 14.

At step 704, the initial conversion gate opening is determined based upon the current average distance to the the true target. The current average distance corresponds to either the average distance computed by the range search routine or the updated average distance computed during the prior execution of the sonar routine. At step 706, the opening of the frequency gate is initialized.

At step 708, the initial gain offset is determined. The amplifier gain used during the sonar routine is generally the same as the gain used in the classification mode of the range search routine. During both routines, the gain gradually increases exponentially from the gain offset value. At step 710, high transmit power is selected by the controller 40 via the line 44.

At step 712, the frequency at which bursts are transmitted is specified by transmitting the current frequency vector to the VCO 50 via the D/A converter 60. At step 713, the program waits for old echoes to die out, and at step 714 an energy burst is transmitted. Steps 716–758 are generally analogous to steps 580–608 set forth in FIGS. 10d and 10e, and the description of these steps is not repeated here.

If the magnitude of the largest sample was not greater than the maximum as determined at step 750, the program branches to step 760. At step 760, the time at which the largest sample was detected is compared with the conversion gate to determine whether the peak of the echo signal occurred within a predetermined "distance" of the center of the conversion gate, such as within three inches of the conversion gate center, for example. If the sample did not occur within a predetermined distance from the center of the conversion gate, the program branches to step 762, which determines whether another retry will be made. If the current number of retries is not greater than a maximum retry number, then the program branches back to step 712 to transmit another burst. Otherwise, the program branches to step 764 where the "no target" and "target outside gate" flags in the sonar status register are set. The sonar routine then exits.

At step 766, the magnitude of the sample is checked to determine whether it is larger than a predetermined minimum. If it is not, the program branches to step 768 where the gain offset is increased, and to step 770 where the new value of the gain offset is compared with a maximum value. If the new gain offset value is greater than the maximum value, the program branches to step 772 where the gain offset is set to the maximum value. Otherwise, step 772 is skipped and the program branches to step 774.

At step 774, the number of retries is compared with a maximum. If no more retries are to be made, the program branches to step 776 where the "no target" and "target too low" flags in the sonar status register are set. Otherwise, the program branches back to step 712 to transmit another energy burst.

If the magnitude of the sample was greater than the minimum value as determined at step 766, then the program branches to step 780, shown in FIG. 13c, where the travel time associated with the sample is determined based upon the time of receipt recorded in step 750. At step 782, the program determines whether the "match fail" flag in the match status register is set.

If the "match fail" flag is not set, indicating that the previous execution of the match routine was successful, the program branches to step 784 where the echo frequency is compared to the burst transmission frequency. If the frequencies match, the program branches to step 800. If the "match fail" flag is set as determined at step 782, the frequency of the echo is not checked, and the program branches to step 800.

If there is a frequency mismatch at step 786, the program branches to step 788, where the number of retry attempts made thus far is compared to a maximum. If no more retries are to be made, the program branches to step 790 where the "no target" and "target off frequency" flags are set in the sonar status register. The sonar routine then terminates.

If another retry is to be made, the program branches from step 788 to step 792 where the position of the conversion gate is adjusted by a relatively small predetermined amount, such as four microseconds. At step 794, the new position of the conversion gate opening is checked to determine whether it is greater than a minimum value. The purpose of this step is to make sure that the conversion gate is not repositioned to overlap the ringdown signal of the transducer 16. If the new gate opening is less than the minimum value, the program branches to step 796 where the gate opening is set to the minimum. The program then proceeds to step 798, where the the position of the frequency gate is shifted by a predetermined amount, and the program branches back to step 712 to transmit another burst.

At step 800, the compensated target distance is computed based upon the travel time determined in step 780 and either the most recent temperature reading or travel time to the reference reflector. At step 802, the compensated distance is added to an accumulator, and at step 804 the program determines whether all the samples have been collected. If all the samples have not been collected, the program branches to step 806 where the conversion gate opening is shifted a very small predetermined amount, such as four microseconds for example. The program then branches back to step 712 for the transmission of another burst.

If all the samples have been collected, the program branches to step 808 where the average compensated target distance is computed by dividing the target distance sum stored in the accumulator of step 802 by the number of samples that were taken. The position of the conversion gate is then adjusted based on the new average target distance determined in step 808. Steps 810–814 are analogous to steps 792–796 and are performed to prevent the conversion gate from overlapping the transducer ringdown signal.

Trim Routine

The controller 40, in addition to executing the main operating routine and its associated routines as described above, also executes a trim routine during calibration of the detector 10. The purpose of the trim routine is to accomplish adjustment of the maximum gain and threshold gain values of the detector 10. These maximum gain and threshold gain values are shown in FIGS. 7a–7d and are described above.

The trim routine is performed by the manufacturer of the detector 10 prior to shipping the detector 10 to a customer. The routine is accomplished by an operator using three principal buttons (not shown) on the detector 10: a button with an "up" arrow which will cause the gain to increase, a button with a "down" arrow which will cause the gain to decrease, and an "enter" button which causes the new gain value to be stored in memory upon completion of the routine.

When the trim routine is used to adjust the maximum gain of the detector 10, a large smooth target is placed at least a predetermined distance, such as 35 feet, away from the transducer 16. An oscilloscope is used to read the voltage generated at the output of the filter 116. The maximum gain is either increased or decreased by the operator until two conditions are satisfied: 1) the echo signal voltage on the oscilloscope just saturates; and 2) the magnitude of the voltage signal generated during the "immediate field" of the detector does not exceed a predetermined voltage, such as 500 millivolts for example. The "immediate field" is described above in connection with FIG. 7a.

When the trim routine is used to adjust the threshold gain of the detector 10, a large smooth target is positioned at the end of the immediate field of the transducer 16, such as eight feet away from the transducer, for example. The threshold gain is adjusted by the operator until the echo signal voltage generated by the oscilloscope is a predetermined value, such as 1.5 volts for example.

A flowchart of the trim routine that facilitates the adjustment of the maximum gain and the threshold gain is shown in FIG. 15. The trim routine 900 begins execution at step 902, where the program waits for an access code. The access code is utilized to prevent unauthorized personnel from adjusting the gain levels of the detector since such adjustment, if not done correctly, will adversely affect the operation of the detector. At step 904, if the access code is valid, the program branches to step 906 which determines whether the operator wished to adjust the maximum gain level of the detector or the threshold gain level. If the access code is not valid, the trim routine terminates.

If the operator indicates that the maximum gain level is to be adjusted, the program branches to step 908, where the current value of the maximum gain is retrieved from a memory location in the controller 40 that is dedicated to storing the value of the maximum gain. The current value of the maximum gain is stored in a counter. Upon the initial performance of the trim routine, the current value of the maximum gain is a predetermined value.

If the operator indicates that the threshold gain level is to be adjusted, the program branches from step 906 to step 910, where the current value of the threshold gain is retrieved from a memory location dedicated to storing the threshold gain. The current value of the threshold gain is stored in the counter. The current value of the threshold gain is also a predetermined value upon initial execution of the trim routine.

Steps 920-930 are repeatedly executed to adjust the gain up or depending upon the input by the operator. At step 920, the gain of the amplifier 90 is set to the gain specified by the counter value, and at step 922, an energy burst is transmitted by the transducer 16.

At step 924, the program determines whether the operator has pressed the button with the "up" arrow. If so, the gain value stored in the counter is incremented at step 926, and the program branches back to step 920 where the amplifier gain is set to the new value, and another burst is transmitted at the new gain.

At step 928, the program determines whether the operator has pressed the button with the "down" arrow. If so, the gain value stored in the counter is decremented at step 930, and the program branches back to step 920 where the amplifier gain is set to the new value, and another burst is transmitted at the new gain.

Steps 920-930 are repeated until the operator presses "enter" button, indicating that the new gain value is correct. At step 932, if the "enter" button has been depressed, the program branches to step 934 where the value of the counter is stored back in the dedicated memory location from which the initial counter value was retrieved at step 908 or 910. The trim routine then terminates.

While many specific numerical parameters have been described in connection with the detailed description set forth above, it should be understood that these numbers are exemplary only, and that many other different numerical parameters could be used.

Many modifications and alternative embodiments of the invention will be apparent to those of ordinary skill in the art in view of the foregoing description of the preferred embodiment. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A detector, comprising:
   a transducer for transmitting an energy burst and receiving an echo from a reflection of the energy burst, said transducer generating an electrical echo signal upon receiving the echo;
   an A/D converter coupled to said transducer to receive said echo signal, said A/D converter repeatedly sampling said echo signal and generating digital signals corresponding to the magnitude of said echo signal;
   gate-generation means coupled to said A/D converter for generating a conversion gate that controls when said A/D converter samples said echo signal, said conversion gate being generated at a time based upon the time at which a prior echo was detected;
   a memory coupled to said A/D converter for storing said digital signals generated by said A/D converter;
   determining means for determining the time of receipt of the digital signal stored in said memory that has the largest magnitude; and
   signal-generation means for generating a signal relating to the travel time between the transmission of said burst of energy and the receipt of said echo based upon the time of receipt determined by said determining means.

2. A detector as defined in claim 1 wherein the duration of said conversion gate is fixed.

3. A detector as defined in claim 1 wherein the time at which said conversion gate opens is varied with respect to the time at which said transducer transmits a burst of energy.

4. A detector as defined in claim 1 wherein the duration of said conversion gate is no greater than about 50 times the duration of said echo signal.

5. A detector as defined in claim 4 wherein the duration of said conversion gate is about six times the duration of said echo signal.

6. A detector, comprising:
   a transducer for transmitting an energy burst and receiving an echo from a reflection of said energy burst, said transducer generating an electrical echo signal upon receiving said echo;
   an A/D converter coupled to said transducer to receive said echo signal, said A/D converter sampling said echo signal at a sampling rate and generating digital signals corresponding to the magnitude of said echo signal, said sampling rate of said A/D converter generating at least about 10 samples of said echo signal so as to substantially determine the position of the peak of said echo signal;
a memory coupled to said A/D converter for storing said digital signals generated by said A/D converter;
determining means for determining the time of receipt of the digital signal stored in said memory having the largest magnitude; and
signal-generation means for generating a signal relating to the travel time between the transmission of said burst of energy and the receipt of said echo based upon the time of receipt determined by said determining means.

7. A detector as defined in claim 6 wherein said sampling rate of said A/D converter generates at least about 50 samples of said echo signal.

8. A detector as defined in claim 6 wherein said detector determines the location of level of a liquid within a tank based upon the signal generated by said signal-generation means.

9. A method of detecting comprising the steps of:
(a) transmitting a burst of energy towards a surface;
(b) receiving an echo of said energy burst after reflection from said surface;
(c) generating an electrical echo signal from said echo received during said step (b);
(d) sampling said echo signal at a sampling rate to generate digital signals corresponding to the magnitude of said echo signal, said sampling rate generating at least about 10 samples of said echo signal so as to substantially determine the position of the peak of said echo signal;
(e) storing said digital signals in a memory;
(f) determining which of said digital signals stored during said step (e) has the largest magnitude;
(g) determining the time at which the digital signal having the largest magnitude was received; and
(h) generating a signal relating to the travel time between the transmission of said energy burst and the time of receipt of said echo signal as determined in said step (g).

10. A method as defined in claim 9 wherein said signal generated during said step (h) is a binary count.

11. A method as defined in claim 9 wherein said energy burst is transmitted towards the surface of a liquid within a tank and additionally comprising the step (i) of determining the location of the liquid level within the tank based upon the signal generated during said step (h).

12. A method as defined in claim 9 additionally comprising the steps of:
(i) comparing the magnitude of said digital signals stored in the memory during said step (e) with a maximum value; and
(j) decreasing the gain with which echo signals are amplified when the magnitude of one of said digital signals exceeds said maximum value.

13. A method of detecting comprising the steps of:
(a) transmitting a burst of energy towards a surface;
(b) receiving an echo of said energy burst after reflection from said surface;
(c) generating an electrical echo signal from said echo received during said step (b);
(d) substantially determining the time occurrence of the peak of said echo signal; and
(e) generating a signal relating to the time between the transmission of said energy burst and the time occurrence of the peak of said echo signal as determined in said step (d).

14. A method of detecting comprising the steps of:
(a) transmitting a burst of energy towards a surface;
(b) receiving an echo of said energy burst after reflection from said surface;
(c) generating an electrical echo signal from said echo received during said step (b);
(d) substantially determining the travel time between the transmission of said burst of energy and the receipt of said echo of said energy burst;
(e) generating a conversion gate based upon the travel time determined during said step (d);
(f) repeating said steps (a)-(c) to generate a second echo signal;
(g) sampling said second echo signal during the duration of said conversion gate to generate digital signals corresponding to the magnitude of said second echo signal;
(h) storing said digital signals in a memory;
(i) determining which of said digital signals stored during said step (h) has the largest magnitude;
(j) determining the time at which the digital signal having the largest magnitude was received; and
(k) generating a signal relating to the time between the transmission of said energy burst and the time of receipt of said second echo signal as determined in said step (j).

15. A method as defined in claim 14 additionally comprising the steps of:
(l) comparing the magnitude of said digital signals stored in the memory during said step (h) with a maximum value; and
(m) decreasing the gain with which echo signals are amplified when the magnitude of one of said digital signals exceeds said maximum value.

16. A method as defined in claim 15 wherein said steps (l) and (m) are performed after said step (h).

17. A method of detecting comprising the steps of:
(a) transmitting an energy burst towards a surface;
(b) receiving an echo of said energy burst after reflection from said surface;
(c) generating an electrical echo signal from said echo received during said step (b);
(d) generating a first conversion gate based upon the expected time of arrival of said echo;
(e) sampling said echo signal during the duration of said first conversion gate to generate digital signals corresponding to the magnitude of said echo signal;
(f) storing said digital signals in a memory;
(g) determining which of said digital signals stored during said step (f) has the largest magnitude;
(h) determining the time at which the digital signal having the largest magnitude was received;
(i) generating a signal relating to the travel time between the transmission of said energy burst and the time of receipt of said echo signal as determined in said step (h);
(j) repeating said steps (a) through (i) to generate a second signal relating to the travel time between the transmission of a second energy burst and the time of receipt of a second echo signal; and 18. A method of determining the location of targets within a given range of a detector by responding to echoes of energy bursts transmitted by the detector, said method comprising the steps of:
(a) transmitting a burst of energy;

(b) gradually decreasing the gain of the detector in accordance with a gain line during travel of said energy burst;

(c) if an echo of said energy burst is received, generating a signal relating to the time of receipt of said echo; and (d) repeating said steps (a) through (c) at least once, with each repetition of said step (b) causing the detector gain to be gradually decreased in accordance with a different gain line whereby targets at different positions within a given range of the detector are detected the generation of different lines.

19. A method as defined in claim 18 wherein said targets comprise different internal structures within a tank.

20. A method as defined in claim 19 wherein one of said targets is the surface of a liquid within the tank.

21. A method as defined in claim 18 wherein said steps (a) through (c) are repeated at least about nine times.

22. A method as defined in claim 18 wherein the shape of said gain lines is stepped.

23. A method as defined in claim 18 wherein the gain is gradually decreased during the repetitions of said step (b) by decreasing the gain by discrete amounts at synchronous intervals following the transmission of said energy bursts.

24. A method as defined in claim 18 wherein the gain is limited to a threshold value during a predetermined period of time after the transmission of an energy burst.

25. A method of determining the location of targets within a given range of a detector by responding to echoes of energy bursts transmitted by the detector, said method comprising the steps of:

(a) transmitting a burst of energy;

(b) gradually decreasing the gain of the detector from an initial value towards a minimum value during travel of said energy burst;

(c) if an echo of said energy burst is detected while the gain is being gradually reduced during said step (b), generating a signal relating to the time of receipt of said echo; and (d) repeating said steps (a) through (c) at least twice, with subsequent repetitions of said step (b) utilizing different initial gain values whereby targets at different locations within a given range of the detector are detected during different performances of said step (b).

26. A method of determining the location of targets within a given range of a detector by responding to echoes of energy bursts transmitted by the detector, said method comprising the steps of:

(a) transmitting a burst of energy;

(b) gradually decreasing the gain of the detector from an initial value towards a minimum value during travel of said energy burst;

(c) if an echo of said energy burst is detected while the gain is being gradually reduced during said step (b), generating a signal relating to the time of receipt of said echo;

(d) repeating said steps (a) through (c), with each repetition of said step (b) being performed with an increased initial gain value, said steps (a) through (c) being repeated until the initial gain value reaches a maximum value;

(e) after the initial gain value reaches said maximum value, transmitting a burst of energy;

(f) after said energy burst is transmitted during said step (e), gradually decreasing the gain of the detector from the maximum value towards a minimum value in accordance with a gain slope;

(g) if an echo of said energy burst is detected while the gain is being gradually reduced during said step (f), generating a signal relating to the time of receipt of said echo; and (h) repeating said steps (e) through (g) a plurality of times, with each repetition of said step (f) being performed with an increased gain slope.

27. A method as defined in claim 26 wherein said steps (e) through (g) are repeated until the gain slope is zero.

28. A method as defined in claim 26 wherein the gradual reduction of the gain during each performance of said step (b) is in accordance with a fixed gain slope.

29. A method as defined in claim 26 wherein the gain is limited to a threshold value during a predetermined period of time after the transmission of an energy burst.

30. A method of determining the location of targets within a given range of a detector by responding to echoes of energy bursts transmitted by the detector, said method comprising the steps of:

(a) transmitting a burst of energy;

(b) gradually decreasing the gain of the detector from an initial value towards a minimum value during travel of said energy burst;

(c) if an echo of said energy burst is detected while the gain is being gradually reduced during said step (b), generating a signal relating to the time of receipt of said echo and storing a signal relating to the gain value at which the echo was detected;

(d) repeating said steps (a) through (c) until an echo is detected, with subsequent repetitions of said step (b) utilizing different initial gain values;

(e) after the detection of an echo, transmitting a burst of energy;

(f) after said energy burst is transmitted during said step (e), holding the gain constant at the gain value at which the echo was detected until the completion of a gain delay period, the duration of said gain delay period being related to the time at which the echo was detected; and (g) upon the completion of said gain delay period, gradually reducing said gain towards said minimum value.

31. A method of searching for targets within a range of a detector, said method comprising the steps of:

(a) transmitting an energy burst;

(b) decreasing the gain of the detector during travel of said energy burst so as to search for a target in an initial portion of said range of the detector; and (c) repeating said steps (a) and (b) a plurality of times so as to search for targets within different portions of said range of the detector.

32. A method as defined in claim 31 wherein the entire defined range of the detector is searched so as to detect substantially all targets within the defined range.

33. A detector, comprising:

a transducer that generates bursts of energy, receives echoes of said energy bursts, and generates electrical echo signals upon receipt of said echoes;

an amplifier coupled to receive said echo signals, said amplifier having a variable gain;

detecting means for detecting echo signals, said detecting means generating an echo-detect signal upon the detection of an echo signal; and control means for controlling the gain of said amplifier during travel of each energy burst, the gain of said amplifier being controlled in accordance with a different, gradually decreasing gain line during travel of each energy burst.

34. A detector as defined in claim 33 wherein said detecting means comprises a comparator.

35. A detector as defined in claim 34 wherein said detecting means additionally comprises an A/D converter.

36. A detector as defined in claim 33 wherein said control means comprises a variable-gain amplifier.

37. A detector as defined in claim 36 wherein said control means additionally comprises a controller coupled to said variable-gain amplifier.

38. A detector as defined in claim 37 wherein said controller gradually decreases said gain lines by discrete amounts at synchronous intervals.

39. A method detecting an echo with a detector having two modes of echo detection, a first mode in which the first echo received is considered to be the true echo and a second mode in which the echo having the largest magnitude is considered to be the true echo, said method comprising the steps of:
 (a) storing echo data in each of a plurality of memory locations in memory, said echo data in each of said memory locations comprising time-of-receipt data and magnitude data for each of a plurality of echoes received by said detector;
 (b) determining the operating mode of said detector, said operating mode being either said first mode of detection or said second mode of detection;
 (c) if the operating mode of said detector is said first mode, searching the contents of each of said memory locations to determine which of said echoes was received first as indicated by said time-of-receipt data, said first-received echo being considered the true echo;
 (d) if the operating mode of said detector is second mode, searching the contents of each of said memory locations to determine which of said echoes had the largest magnitude as indicated by said magnitude data, said largest-magnitude echo being considered the true echo; and
 (e) determining travel-time data based upon the true echo as determined either in said step (c) or said step (d).

40. A method as defined in claim 39 wherein said step (b) is performed after said step (a).

41. A method of detecting an echo with a detector having two modes of echo detection, a first mode in which the first echo received is considered to be the true echo and a second mode in which the echo having the largest magnitude is considered to be the true echo, said method comprising the steps of:
 (a) determining the operating mode of said detector, said operating mode being either said first mode of detection or said second mode of detection;
 (b) if the operating mode of said detector is said first mode, searching the contents of a plurality of memory locations having echo data corresponding to a plurality of echoes stored therein to determine which of said echoes was received by said detector first, said first-received echo being considered the true echo;
 (c) if the operating mode of said detector is said second mode, searching the contents of a plurality of memory locations having echo data corresponding to a plurality of echoes stored therein to determine which of said echoes received by said detector had the largest magnitude, said largest-magnitude echo being considered the true echo; and
 (d) determining travel-time data based upon the true echo as determined either in said step (b) or said step (c).

42. A method as defined in claim 41 wherein said memory locations are provided in a buffer.

43. A method as defined in claim 41 wherein echo data corresponding to a single echo is stored in each of said memory locations.

44. A method as defined in claim 41 where the memory locations searched during said step (b) are the same memory locations that are searched during said step (c).

45. A method of detecting an echo with a detector having two modes of echo detection, a first mode in which the first echo received is considered to be the true echo and a second mode in which the echo having the largest magnitude is considered to be the true echo, said method comprising the steps of:
 (a) determining the operating mode of said detector, said operating mode being either said first mode of detection or said second mode of detection;
 (b) if the operating mode of said detector is first mode, searching the contents of a plurality of memory locations having echo data corresponding to a plurality of echoes stored therein to determine which of said echoes was received by said detector first, said first-received echo being considered a candidate echo;
 (c) if the operating mode of said detector is said second mode, searching the contents of a plurality of memory locations having echo data corresponding to a plurality of echoes stored therein to determine which of said echoes received by said detector had the largest magnitude, said largest-magnitude echo being considered a candidate echo;
 (d) searching the contents of at least one memory location having bogus target data corresponding to at least one bogus target stored therein to determine whether said candidate echo identified during either said step (b) or said step (c) corresponds to a bogus target;
 (e) if said candidate echo corresponded to a bogus target as determined at said step (d), repeating said steps (b) through (d) at least once to determine another candidate echo, each repetition of said step (b) ignoring for purposes of candidate echo determination any echo data that was determined to correspond to a bogus target at said step (d).

46. A method as defined in claim 45 wherein said at least one bogus target corresponds to an internal structure within a tank.

47. A detector, comprising:
 means for automatically determining the existence of at least one bogus target within a tank;
 a memory for storing bogus target data corresponding to the bogus target determined by said bogus target determining means;
 a transducer for transmitting an energy burst and generating an electrical echo signal in response to receiving an echo of said energy burst;
 means for generating echo data based upon the characteristics of said echo signal; and
 means for comparing said echo data with said bogus target data to determine whether said echo corresponds to said bogus target.

48. A detector as defined in claim 47 additionally comprising means for determining the location of a surface within said tank.

49. A detector as defined in claim 47 additionally comprising a memory for storing said echo data.

50. A detector as defined in claim 48 wherein said bogus target determining means determines the distance between said transducer and said surface and stores said distance in said memory.

51. A method of discriminating between true echoes and bogus echoes, said method comprising the steps of:
   (a) automatically determining the existence of at least one bogus target within a tank;
   (b) storing in memory bogus target data relating to said bogus target automatically determined in said step (a);
   (c) transmitting an energy burst;
   (d) generating an electrical echo signal in response to receiving an echo of said energy burst;
   (e) generating echo data based upon the characteristics of said echo signal;
   (f) comparing said echo data with said bogus target data stored in memory during said step (b) to determine whether said echo corresponds to said bogus target; and
   (g) if said echo corresponds to said bogus target, ignoring said echo for purposes of determining the location of a surface within the tank.

52. A method as defined in claim 51 wherein said step (a) is performed when the tank is empty.

53. A method as defined in claim 51 wherein said step (a) is performed when the tank contains a liquid the level of which is known.

54. A method as defined in claim 51 wherein said step (a) comprises the steps of:
   (h) transmitting an energy burst within the tank;
   (i) receiving an echo of said energy burst; and
   (j) analyzing the time at which said echo was received to determine whether said echo was generated by a surface at a known position.

55. A method as defined in claim 54 wherein said surface comprises the surface of a liquid.

56. A method as defined in claim 54 wherein said surface comprises the bottom of the tank.

57. A detector, comprising:
   a first memory location for storing an access code;
   means for comparing an access code entered by operator with said access code stored in said first memory location, said comparing means generating an access-code match signal in response to said access codes being identical;
   means for retrieving a gain value from a second memory location in response to said access-code match signal;
   means for adjusting said gain value to a new value in response to input from an operator; and
   means for storing said new gain value back in second memory location in response to the detection of an adjust-complete signal.

58. A method of setting a gain value within a detector, said method comprising the steps of:
   (a) retrieving a gain value from a first memory location and storing said gain value in a temporary memory location;
   (b) transmitting a burst of energy;
   (c) generating an electrical echo signal upon receiving an echo of said energy burst;
   (d) amplifying said echo signal by an amount corresponding to the contents of said temporary memory location;
   (e) upon the detection of an increase-gain signal, increasing said gain value by incrementing the contents of said temporary memory location;
   (f) upon the detection of a decrease-gain signal, decreasing said gain value by decrementing the contents of said temporary memory location;
   (g) upon the detection of a gain-correct signal, storing the current contents of said temporary memory location back in said first memory location; and
   (h) repeating steps (b) through (f) until a gain-correct signal is detected during said step (g).

59. A method as defined in claim 58 wherein said temporary memory location comprises a counter.

60. A method as defined in claim 59 wherein said counter comprises a computer program variable.

61. A method as defined in claim 58 wherein said gain value comprises a maximum gain limit.

62. A method of setting a gain value within a detector, said method comprising the steps of:
   (a) retrieving a gain value from a first location and storing said gain value in a temporary memory location;
   (b) waiting for the occurrence of a gain-control signal, said gain-control signal being either an increase-gain signal, a decrease-gain signal, or a gain-correct signal, and performing one of the following steps (b1), (b2), (b3), depending on the gain-control signal detected:
      (b1) if said gain-control signal comprises an increase-gain signal, increasing said gain value by incrementing the contents of said temporary memory location;
      (b2) if said gain-control signal comprises a decrease-gain signal, decreasing said gain value by decrementing the contents of said temporary memory location;
      (b3) if said gain control signal comprises a gain-correct signal, storing the current contents of said temporary memory location back in said first memory location; and
   (c) repeating step (b) until a gain-correct signal is detected.

63. A method of setting a gain value within a detector, said method comprising the steps of:
   (a) retrieving a gain value from a first memory location and storing said gain value in a temporary memory location;
   (b) waiting for the occurrence of a gain-control signal, said gain-control signal being either a gain-increase signal, a gain-decrease signal, or a gain-correct signal, and performing one of the following steps (b1), (b2), (b3), depending on the gain-control signal detected:
      (b1) if said gain-control signal comprises a gain-increase signal, increasing said gain value by incrementing the contents of said temporary memory location;
      (b2) if said gain-control signal comprises a gain-decrease signal, decreasing said gain value by decrementing the contents of said temporary memory location;
      (b3) if said gain-control signal comprises a gain-correct signal, storing the current contents of said temporary memory location back in said first memory location; and (c) repeating step (b) until a gain-correct signal is detected, wherein said gain-increase signal is generated by the depression of a button with an "up" arrow, wherein said gain-decrease signal is generated by the depression of a button with a "down" arrow, and wherein said gain-correct signal is generated by the depression of an "enter" button.

64. A method of setting a control value within a detector, said method comprising the steps of:
  (a) detecting the entry of an access code;
  (b) comparing said entered access code to an authorized access code stored in a memory;
  (c) if said entered access code matches said stored access code, retrieving a control value from a first memory location and storing said control value in a temporary memory location;
  (d) detecting the occurrence of control value-adjust signal and adjusting the contents of said temporary memory location based upon said control value-adjust signal; and
  (e) detecting the occurrence of an adjust-complete signal and storing the current contents of said temporary memory location back in said first memory location in response to detecting said adjust-complete signal.

65. A method as defined in claim 64 wherein said step (d) is repeated at least once after the performance of said step (c) and prior to the performance of said step (e).

66. A method as defined in claim 64 wherein said adjust-complete signal is generated upon the depression of an "enter" button.

67. A method as defined in claim 64 wherein said control value comprises a gain value.

68. A detector as defined in claim 1 wherein said energy burst is transmitted at a transmission frequency and wherein said A/D converter samples said echo signal at a sampling rate of at least about twice said transmission frequency.

69. A method as defined in claim 13 wherein said burst of energy is transmitted at a transmission frequency and wherein the time occurrence of the peak of said echo is determined by sampling said echo signal at a sampling rate of at least twice said transmission frequency.

* * * * *